United States Patent
Maillot et al.

(10) Patent No.: US 7,133,044 B2
(45) Date of Patent: Nov. 7, 2006

(54) SYSTEM OF FEATURE-BASED SURFACE MAPPING

(75) Inventors: Jerome Maillot, Toronto (CA); Xiaohuan Wang, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 377 days.

(21) Appl. No.: 10/059,292

(22) Filed: Jan. 31, 2002

(65) Prior Publication Data

US 2002/0190988 A1    Dec. 19, 2002

Related U.S. Application Data

(60) Provisional application No. 60/290,669, filed on May 15, 2001.

(51) Int. Cl.
  *G06T 15/30*    (2006.01)
(52) U.S. Cl. .............. 345/423; 345/419; 345/581; 345/582; 345/583; 345/584
(58) Field of Classification Search ............ 345/423, 345/428, 584, 419, 581, 582, 583
  See application file for complete search history.

(56) References Cited

U.S. PATENT DOCUMENTS

| | | | | |
|---|---|---|---|---|
| 5,428,718 A | * | 6/1995 | Peterson et al. | 345/423 |
| 5,886,702 A | * | 3/1999 | Migdal et al. | 345/423 |
| 6,256,038 B1 | * | 7/2001 | Krishnamurthy | 345/419 |
| 6,462,740 B1 | * | 10/2002 | Immel | 345/473 |

OTHER PUBLICATIONS

James F. Blinn, "Simulation of Wrinkled Surfaces", Proceedings of SIGGRAPH '78 (1978).

Robert L. Cook, et al. "The Reyes Image Rendering Architecture", Pixar, P.O. Box 13719, San Rafael, CA 94913.

Wolfgang Heidrich, et al., "Ray-tracing Procedural Displacement Shaders," Computer Graphics Group, University of Erlangen, Graphics Interface '98.

Hugues Hoppe, et al., "Surface Reconstruction from Unorganized Points", University of Washington, Seattle, WA 98195.

Michael Kass, et al., "Snakes: Active Contour Models", Schlumberger Palo Alto Research, 3340 Hillview Ave., Palo Alto, CA 94304.

Peter Lindstrom, et al., "Real-Time, Continuous Level of Detail Rendering of Height Fields", Georgia Institute of Technology, SAIC (1996).

(Continued)

*Primary Examiner*—Kimbinh T. Nguyen
(74) *Attorney, Agent, or Firm*—Staas & Halsey LLP

(57) ABSTRACT

A method of displacing a tessellated surface, based on features of a displacement map, by analyzing a model to determine the level of detail in the model. Where the level of detail is high the number of polygons, typically triangles, used to represent the high detail area is increased through the use of "sub-triangles". The positions of the sub-triangles are also strategically located and constrained to better represent the high detail area, particularly any edges in the area. The level of detail can be determined using a displacement map for the surface. The positions of the triangles can be located by determining feature points (or sub-triangle vertices) in the areas of detail where the feature points can be moved toward the areas of high rate of change and additional feature points can be added. The feature points can be connected to form the sub-triangles with an emphasis or constraint on connecting points along an edge or border.

24 Claims, 22 Drawing Sheets

OTHER PUBLICATIONS

William E. Lorensen, et al., "Marching Cubes: A High Resolution 3D Surface Construction Algorithm", General Electric Company, Corporate Research and Development, Schenectady, New York 12301 (1987).

Nelson L. Max, "Horizon mapping: shadows for bump-mapped surfaces", The Visual Computer (1988) 4:109-117.

F. Kenton Musgrave, "Grid Tracing: Fast Ray Tracing for Height Fields," Department of Mathematics, Yale University, Nov. 3, 1990.

Matt Pharr, et al., "Geometry Caching for Ray-Tracing Displacement Maps".

Xiaohuan Corina Wang, et al., "Feature-based Displacement Mapping".

* cited by examiner

SYSTEM OF FEATURE-BASED SURFACE MAPPING

CROSS-REFERENCE TO RELATED APPLICATION

This application is related to and claims priority to U.S. application entitled "Feature-based displacement mapping", having Ser. No. 60/290,669, by Jerome Maillot and Xiaohuan Wang, filed May 5, 2001 and incorporated by reference herein.

BACKGROUND OF THE INVENTION

1. Field of the Invention

The present invention is directed to displacing or offsetting surfaces and, more particularly, to a system that provides a higher density of tessellation where detail of the object is the greatest.

2. Description of the Related Art

In the field of computer graphics, there are various approaches to adding visual complexity to a surface. Texture mapping and bump mapping have been used to add visual effects to surfaces. Bump mapping perturbs surface normals but does not alter the actual surface geometry, causing artifacts that are particularly noticeable from silhouette views. Both approaches leave the actual geometry of the surface smooth and unaltered, regardless of the complexity of the mapping. Shadowing and reflection are also problematic. These problems can be avoided by altering the surface geometry to add detail or complexity to the surface. This approach, called displacement mapping, avoids shortcomings related to texture and bump mapping.

A displacement map is a way of using a scalar height field $h(x,y)$ to specify an offset surface $S'(x,y)$. Given a surface $S(x,y)$ with normal field $N(x,y)$, the offset surface is defined as $S'(x,y)=S(x,y)+h(x,y)N(x,y)$. This offsetting operation presents numerous problems, including problems in performing the offset operation, and problems with the final offset surface, which is usually a polygonal mesh.

In rendering applications, surfaces are often represented by meshes, whereas height fields are often represented by parametric mappings that are unrelated to the surface. One way of offsetting a mesh surface is to simply displace vertices of the mesh according to the height field and the normals of the surface. However, the resulting offset surface mesh will have a vertex density on the order of the original surface. As a result, a vertex-sparse original mesh often results in a displaced mesh that has too few vertices to accurately represent complex features of the height field, such as curves and edges, resulting in an undersampled or coarse offset surface. Furthermore, offsetting a vertex-dense original mesh requires increased computing resources, and often results in a displaced mesh that has more vertices than are necessary to portray the features and complexity of the height field. The number of unnecessary vertices in a vertex-dense offset mesh is usually significant, and impractical or impossible computing resources are often required to store and manipulate the mesh. Furthermore, even vertex-dense meshes often contain artifacts such as stripes, cracks, and zippers.

Micropolygon decomposition is another unsatisfactory displacement approach. FIG. 1 shows a surface displaced with micropolygon decomposition 50. This approach tessellates each surface into polygons that are smaller than a quarter of a screen pixel. Because geometry is rendered in surface order, clipped to the size of screen tiles, and then immediately purged once shaded, the practical incurred memory cost of an otherwise explicitly high polygon density from such a tessellation is minimal. However, this approach produces cracks, and produces stretched polygons for rapidly varying displacement maps.

Simplifying a dense offset mesh is also not satisfactory because large amounts of temporary memory are still required to store the initial dense offset mesh. Furthermore, high tessellation densities may be initially encountered, even where the displacement features are sparse.

What is needed is an efficient displacement mapping technique that produces high-quality displacement mapped surfaces that optimally represent the features and complexity of the displacing height field.

SUMMARY OF THE INVENTION

It is an aspect of the present invention to provide a system for generating a high-quality offset surface that is independent of the mesh density of the original displaced surface.

It is another aspect of the present invention to provide a system for generating a high-quality surface based on features of the surface.

It is another aspect of the present invention to provide a system for generating a surface that uses a minimal set of vertices to accurately represent the features and complexity of the surface.

It is an aspect of the present invention to provide a system capable of supporting the traditional workflow approach of surface layering, as for example with the application of shading and texturing surfaces.

It is another aspect of the present invention to provide a system efficient enough at displacement mapping to generate offset surfaces on-the-fly in a rendering setting, and capable of use in real-time and ray-tracing contexts.

It is another aspect of the present invention to provide a system for displacement mapping that generates offset surfaces that are suitable for rendering with quality comparable to existing and future rendering packages.

It is another aspect of the present invention to provide a system for generating offset surfaces of an original surface by producing a mesh that both accurately approximates the offset surface and that uses a minimal number of vertices.

It is another aspect of the present invention to provide a system for generating offset surfaces of an original surface by producing a mesh that avoids artifacts while using a minimal number of vertices.

It is another aspect of the present invention to provide a system for generating accurate, optimal density, high-quality offset surfaces without requiring large amounts of temporary memory.

It is another aspect of the present invention to provide a system for generating accurate, optimal density, high-quality offset surfaces while preserving the parts of the original surface that are not displaced.

It is another aspect of the present invention to provide a system for displacing a surface, where the resolution of the displacement may be dynamic, based on viewpoint, based on different values in different user-selected regions, based on feature size, based on resolution size, based on vertex density, and or based on ratios of the aforementioned other bases.

The present invention provides the above aspects by analyzing a model to determine the level of detail in the model. Where the level of detail is high the number of polygons, typically triangles, used to represent the high detail area is increased through the use of "sub-triangles".

The positions of the sub-triangles are also strategically located and constrained to better represent the high detail area, particularly any edges in the area. The level of detail can be determined using a displacement map for the surface. The positions of the triangles can be located by determining feature points (or sub-triangle vertices) in the areas of detail where the feature points can be moved toward the areas of high rate of change and additional feature points can be added. The feature points can be connected to form the sub-triangles with an emphasis or constraint on connecting points along an edge or border.

The above aspects can also be attained by a system that displaces a surface by tessellating the surface into a first set of triangles, where the tessellation has a fineness, according to the size of the triangles, that is sufficient to represent the surface, but not sufficient to represent detail in a displacement map.

A set of points for each triangle in the first set may be derived by creating a non-orthogonal coordinate system defining a grid of points on and in the triangle, wherein the two shortest sides of the triangle are axes of the coordinate system and the triangle vertex where the axes intersect is the origin of the coordinate system. Height values for most of the points may be calculated by sampling a height field. A feature metric may be calculated for most of the points in a triangle by summing Taylor approximations taken in directions of points neighboring a point, where the Taylor approximations are calculated using the height values of the neighboring points, and where the feature metric approximates an amount of local curvature in the height field in a local area of the point. Points that have a feature metric indicating that the point is in a substantially locally flat area of the height field may be discarded.

A feature orientation may be calculated for the points that were not discarded by using a least squares minimization to fit a linear function to a plurality of points neighboring the point, where the feature orientation is a discrete gradient of the height field that approximates a direction from the point that has the greatest rate of local height change. The height field may be further sampled at points uniformly distributed along a line segment within a point's neighborhood, where a line segment passes through its point in the direction of the feature orientation of the point, and where a rate of height change in the height field along the line segment is approximated for the point and each sample point by using their height field values.

Points may be relocated to the location of the closest sample point on the line segment that has a rate of height change above a given threshold, and points may be added at sample points on the line segment having a rate of height change indicating an extrema or feature in the height field.

A second set of triangles may then be created by constraining a Delaunay triangulation of the set of points of each triangle in the first set of triangles, where a constraint is a feature border of the height field in the triangle that is identified by the set of points. A final displaced surface geometry may be built using the second set of triangles.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
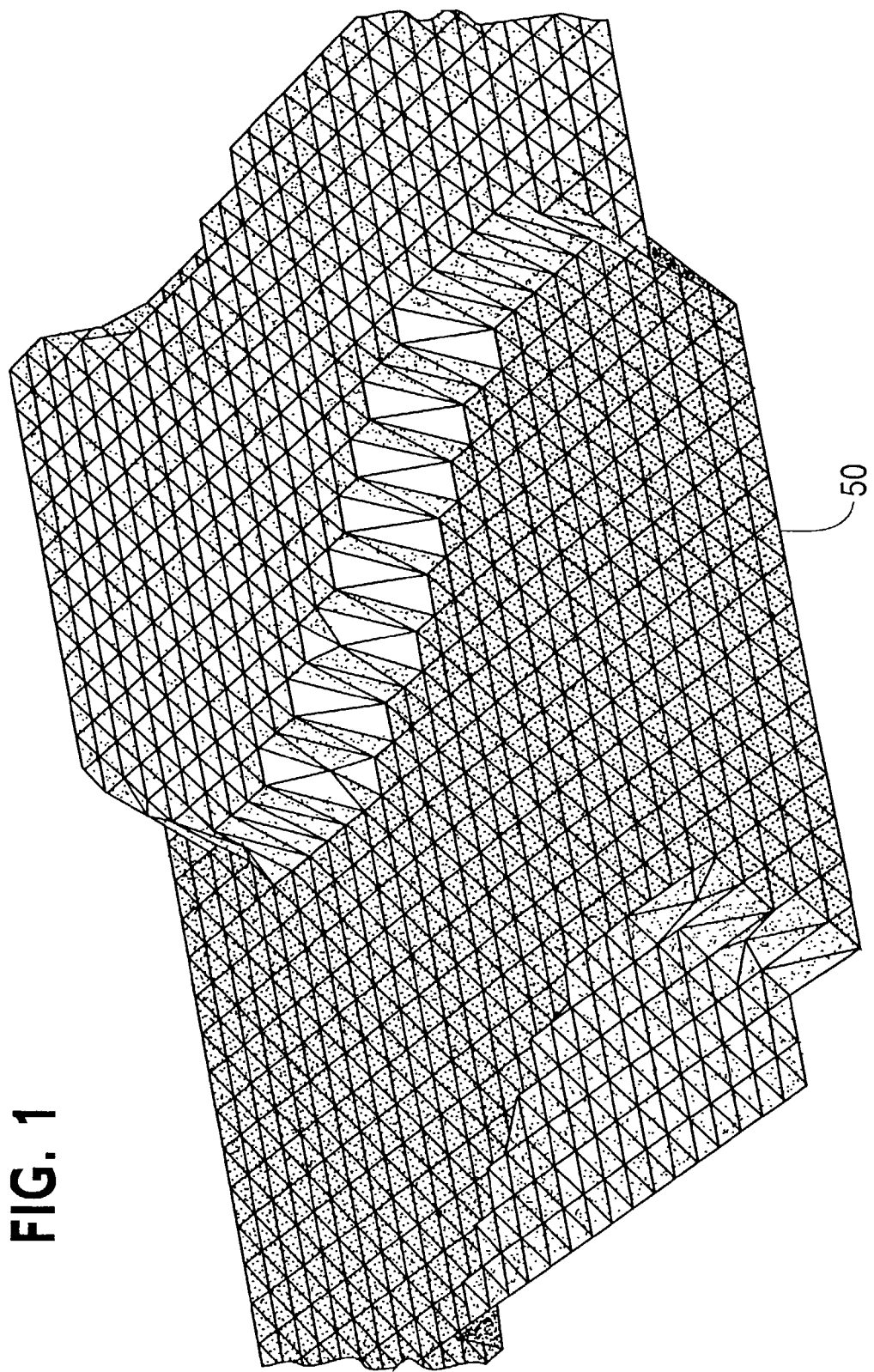
FIG. 1 shows a surface displaced with micropolygon decomposition 100.
Figure 2:
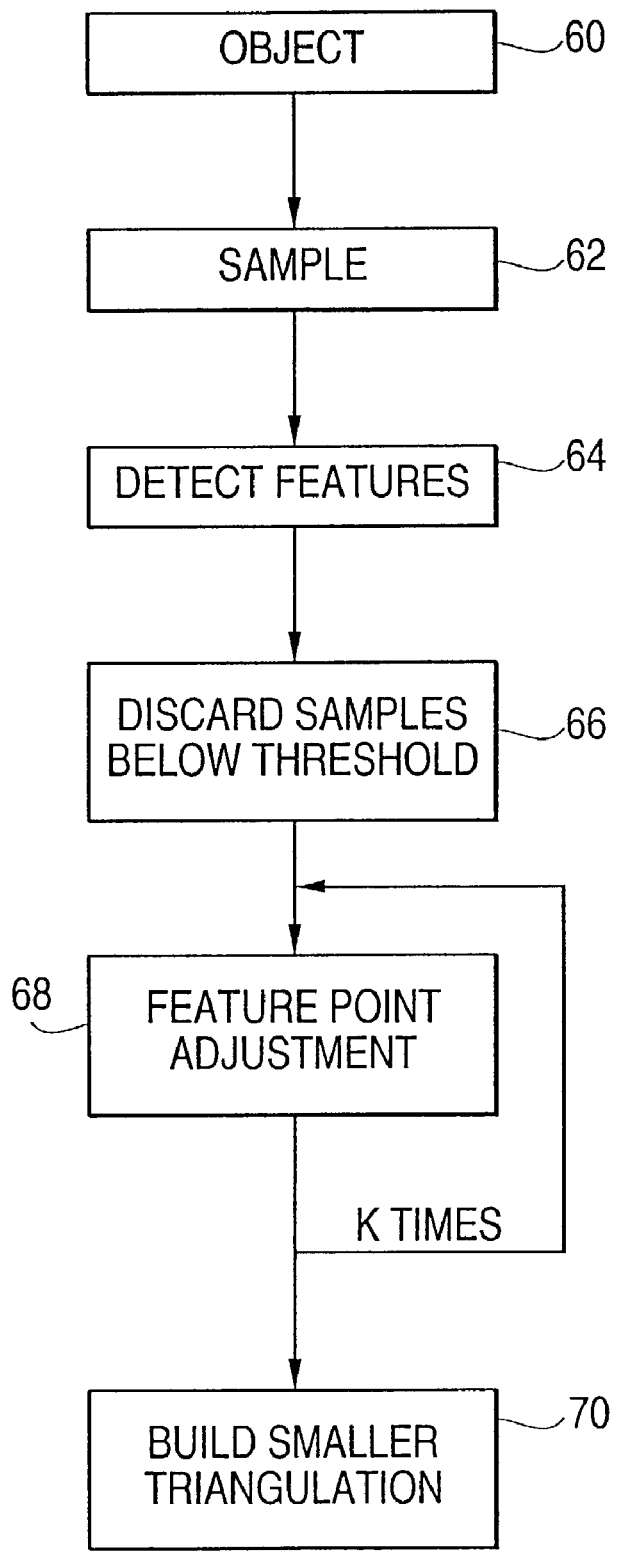
FIG. 2 shows a flowchart of a method according to an embodiment of the invention.

FIG. 2 shows a flowchart of a method according to an embodiment of the invention. Initially, an object is input 60. The object is sampled 62 in the height field resulting in a height map. Following the sampling 62, the method detects features 64 in the height map. Based on the features, samples below a threshold are discarded 66. The remaining feature points are adjusted 68 and new points are added, possibly repeated k times. Finally the feature points are used to build a smaller triangulation 70.

Figure 3:
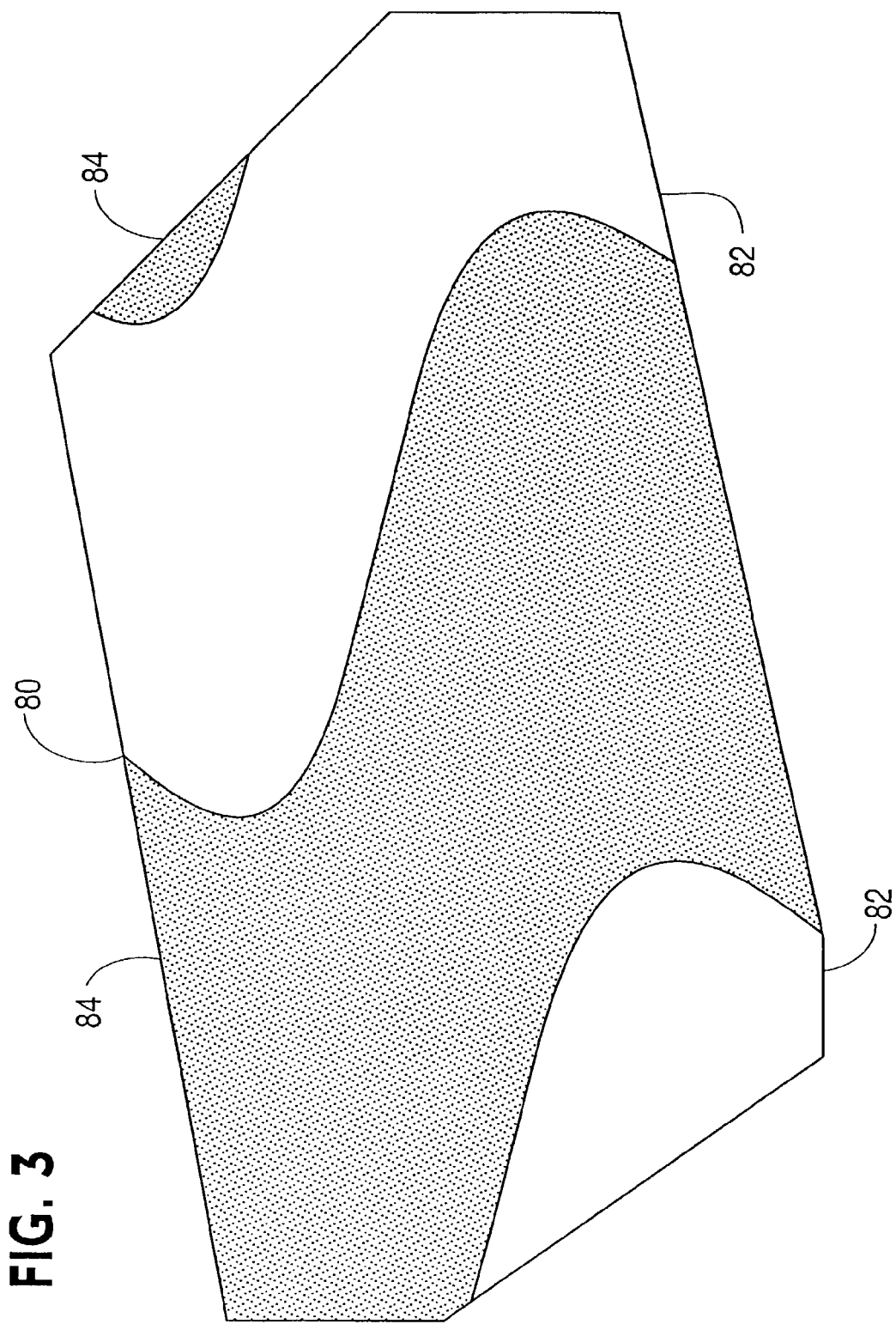
FIG. 3 shows an original surface 80 including a sinusoidal wave displacement area 82 colored white, and a non-displaced area 84 colored black.

FIG. 3 shows an original surface 80 including a sinusoidal wave displacement area 82 colored white, and a non-displaced area 84 colored black. The displacement area 82 is an area that will be offset by a displacement function. The non-displaced area is an area of the original surface 80 that remains unchanged. The present invention offsets a surface, as for example original surface 80, by analyzing a height field to find details of the height field. An original surface is divided into triangles (tessellated), or some other shape or polygon. Each triangle is uniformly sampled using the height field, generating a two-dimensional height map for each triangle. The height map of a triangle is used to generate a two-dimensional feature map of the triangle. The feature maps for the triangles are adjusted according to their features. The two-dimensional feature maps are triangulated to form a final mesh.

Figure 4:
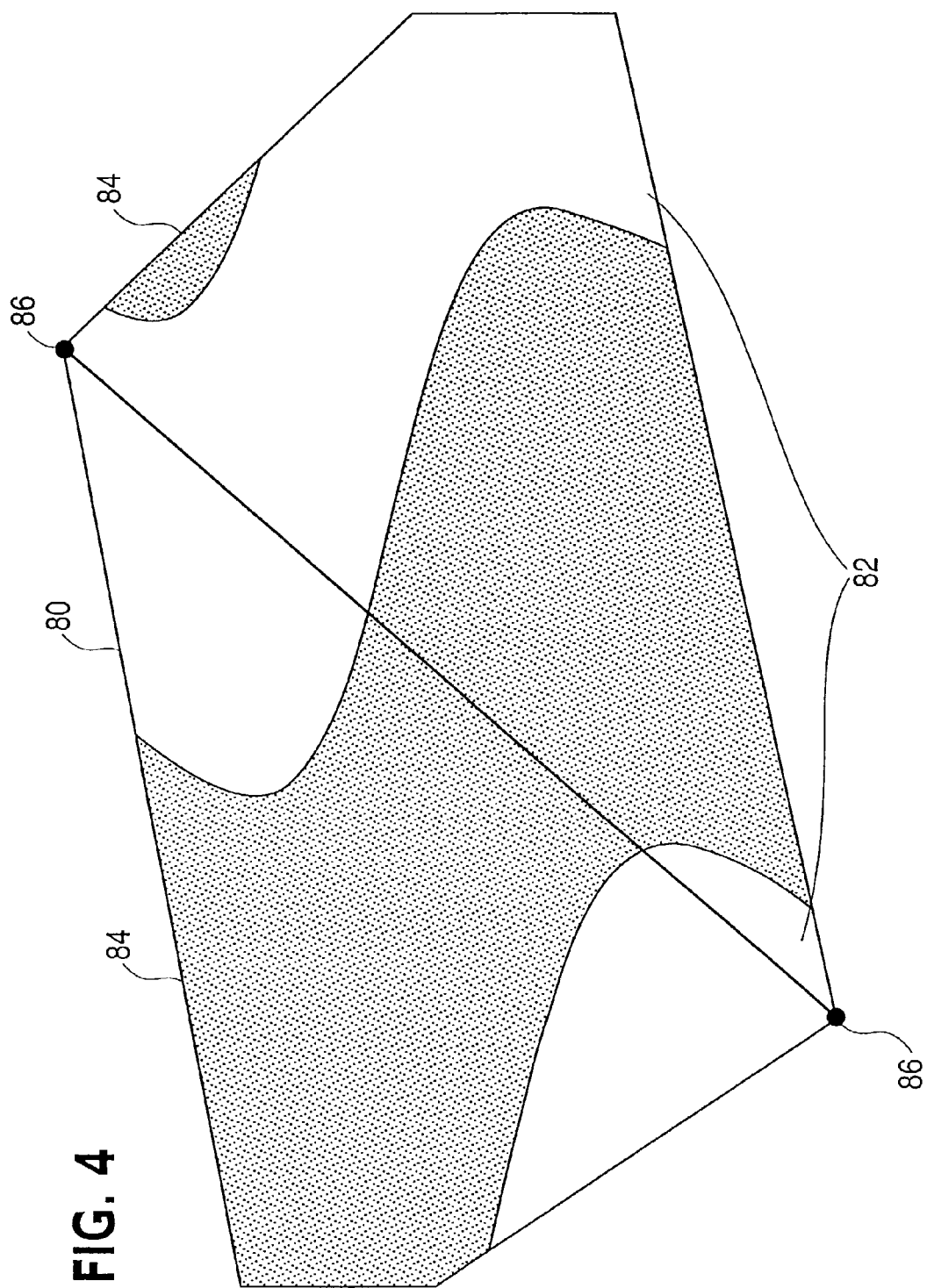
FIG. 4 shows a two-triangle original tessellation of the original surface 80 seen in FIG. 3.

FIG. 4 shows a two-triangle original tessellation of the original surface 80 seen in FIG. 3. As in FIG. 3, original surface 80 includes a sinusoidal wave displacement area 82 colored white, and a non-displaced area 84 colored black. In rendering applications, the surface geometries that are to be displaced are often described separately from displacement maps and texture maps. This separation permits maps and shaders to be layered onto the original surface geometry, which is usually parameterized. Curved original surfaces, such as Non-Uniform Rational B-Splines (NURBS) and subdivision surfaces, are usually approximated by a tessellation. Therefore, the displacement process generally starts with an original surface that is comprised of a set of triangles called an original tessellation, as shown for example in FIG. 4. The vertices of an original tessellation are preferably dense enough to represent the original surface, but not dense enough to represent a displacement of the surface. Examples of these vertices are shown in FIG. 4 by vertices 86.

Figure 5:
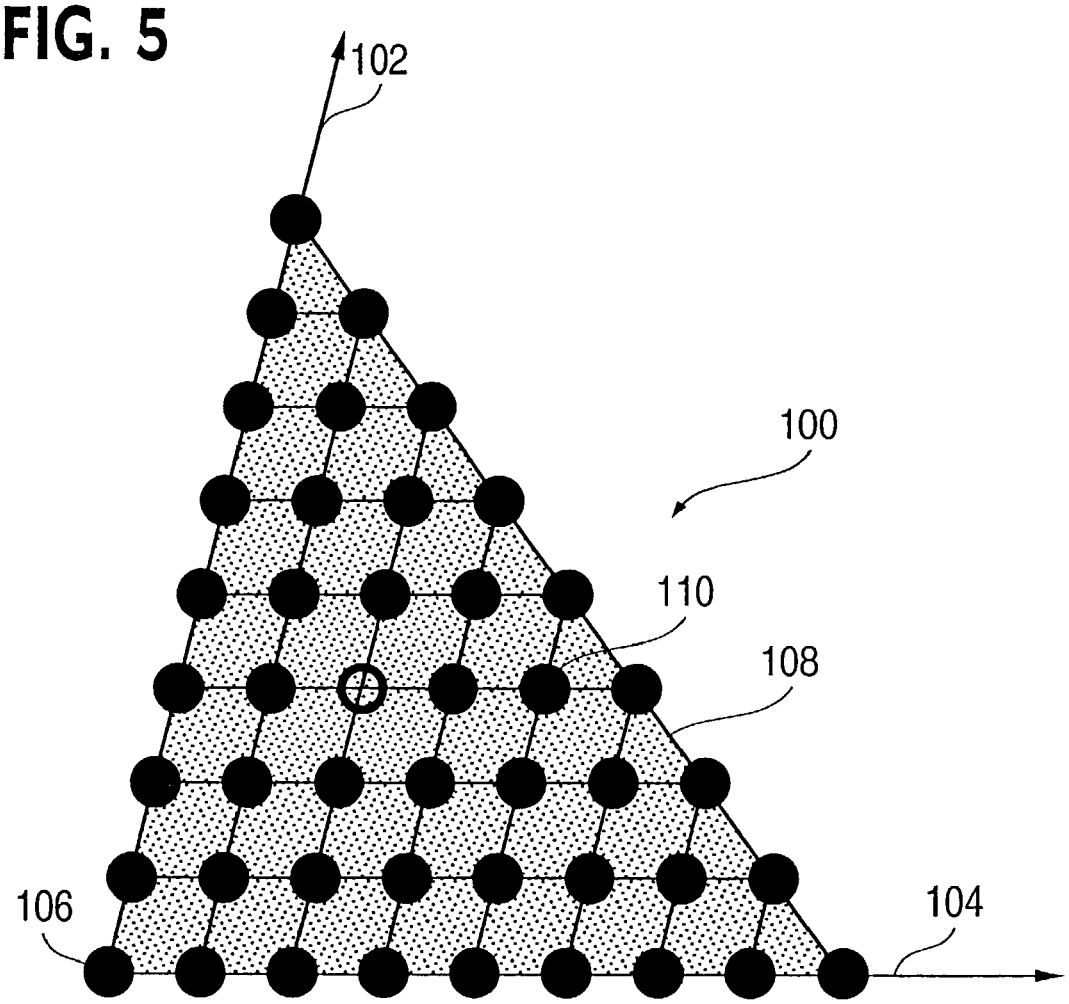
FIG. 5 shows an example of a triangle 100 in an original tessellation, where the triangle has a sample point grid, defined by axes 102, 104, and origin point 106, that is used in generating a height map for the triangle.

FIG. 5 shows an example of a triangle 100 in an original tessellation, where the triangle has a sample point grid, defined by axes 102, 104, and origin point 106, that is used in generating a height map for the triangle. The diagonal line of the triangle is line 108. For each triangle of an original tessellation, a local height map is generated by uniformly sampling the height field in the barycentric space of the triangle at the coordinates of each sample point, of which sample point 110 is an example. In the triangle 100 of FIG. 5, the points shown in the triangle would be sampled in the height field. This approach is preferred because it allows the displacement to be defined for complex shading networks, such as combinations of varied-resolution textures, or procedural textures. Other mapping techniques such as uv-mapping or projection mapping may be used to generate the height map of a triangle, and other sampling schemes may also be used.

Figure 6:
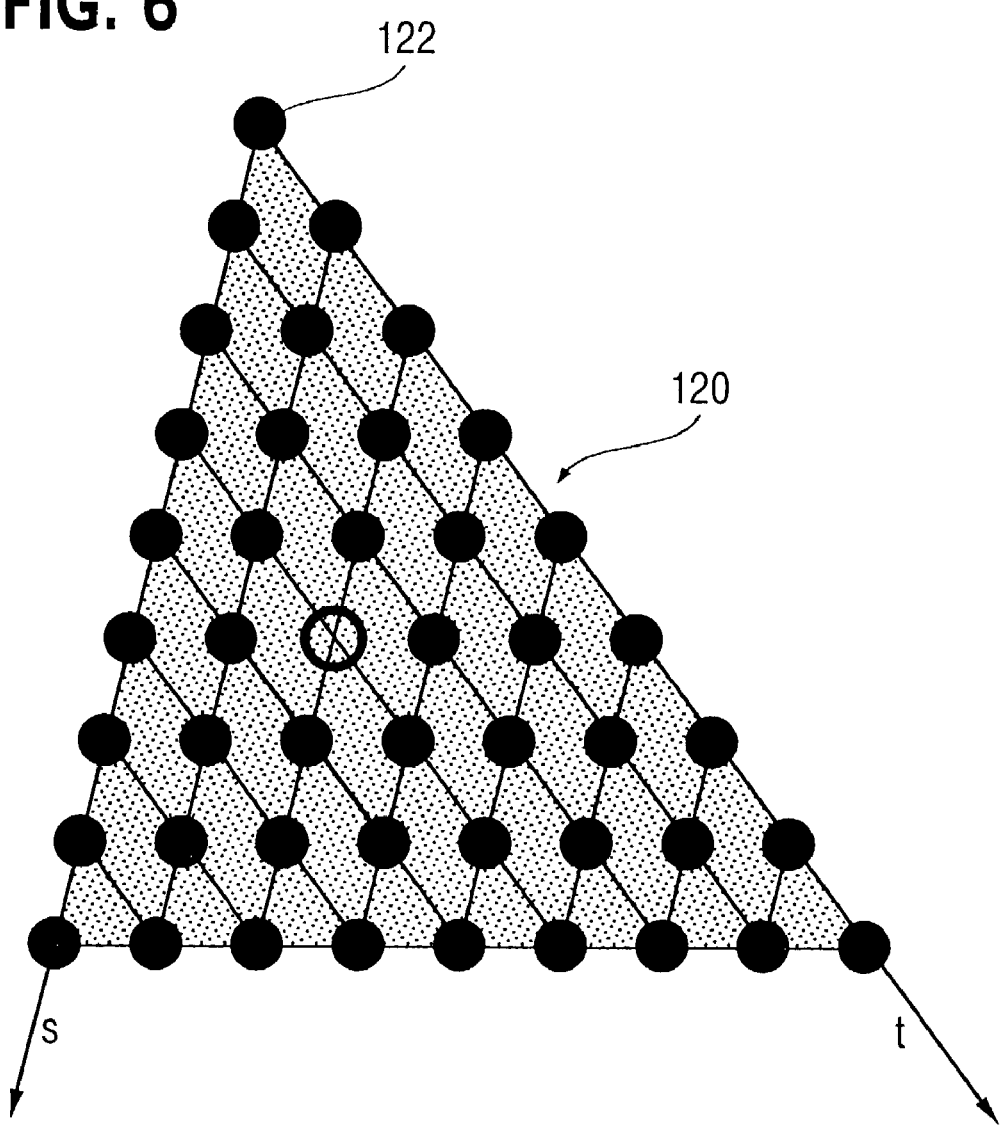
FIG. 6 shows a triangle 120 with a grid based on an inferior origin 122 that is not opposite the longest side of the triangle 120, resulting in a grid that exhibits more oblique distortion than the grid in FIG. 5.

Sampled grid points are generated for each triangle, and are preferably regularly and uniformly spaced, which facilitates simple and fast feature detection, and which also provides a natural filtering method that can be passed to the sampling method. The grid is created by first choosing an origin for the grid, for example origin point 106, where the origin is the triangle vertex that faces the longest triangle edge line 108. This choice improves the accuracy of later-discussed feature computations by minimizing oblique distortion introduced by the non-orthogonal coordinate system, which improves the layout of local neighborhoods of sample points used in the feature computations. The advantage of so choosing the origin can be seen by comparing FIG. 5 with FIG. 6. FIG. 6 shows a triangle 120 with a grid based on an inferior origin 122 that is not opposite the longest side of the triangle 120, resulting in a grid that exhibits more oblique distortion than the grid in FIG. 5.

After an origin for a grid is chosen, the axes of the grid are uniformly sampled n+1 times, from the origin, to produce a grid of $$\frac{1}{2}(n+1)(n+2)$$

sample points. In other words, for each triangle, the number n defines a resolution of features that can be detected in the triangle, where each triangle has on the order of $$\frac{n^2}{2}$$

sample points. In FIG. 5, n=8, and there are 45 sample points. Sample points of a grid, on and in a triangle, are discretely addressable as $$P_{i,j} = \left(\frac{i}{n}, \frac{j}{n}\right), \text{ where } i, j \in [0, n]; i + j \leq n$$

The value of n may be set in various ways. The value of n can be set by a user, and the user may divide the original tessellation into regions requiring different n values. Such regions can be determined by painting, graphical delineation, or the like. The value of n can also be determined algorithmically. The value can be determined based on the point of view, a feature size of the displacement map, and other context sensitive factors. The value of n can therefore vary from one triangle to the next, according to necessity. The number of sample points can also be determined using a preferred distance between sample points, in which case the value will not be the same for all triangles. For example, a user might specify a distance of 1 millimeter, and n for each triangle would be set to accommodate sample points spaced 1 millimeter apart. The value of n can also be set as a ratio of feature size.

Figure 7:
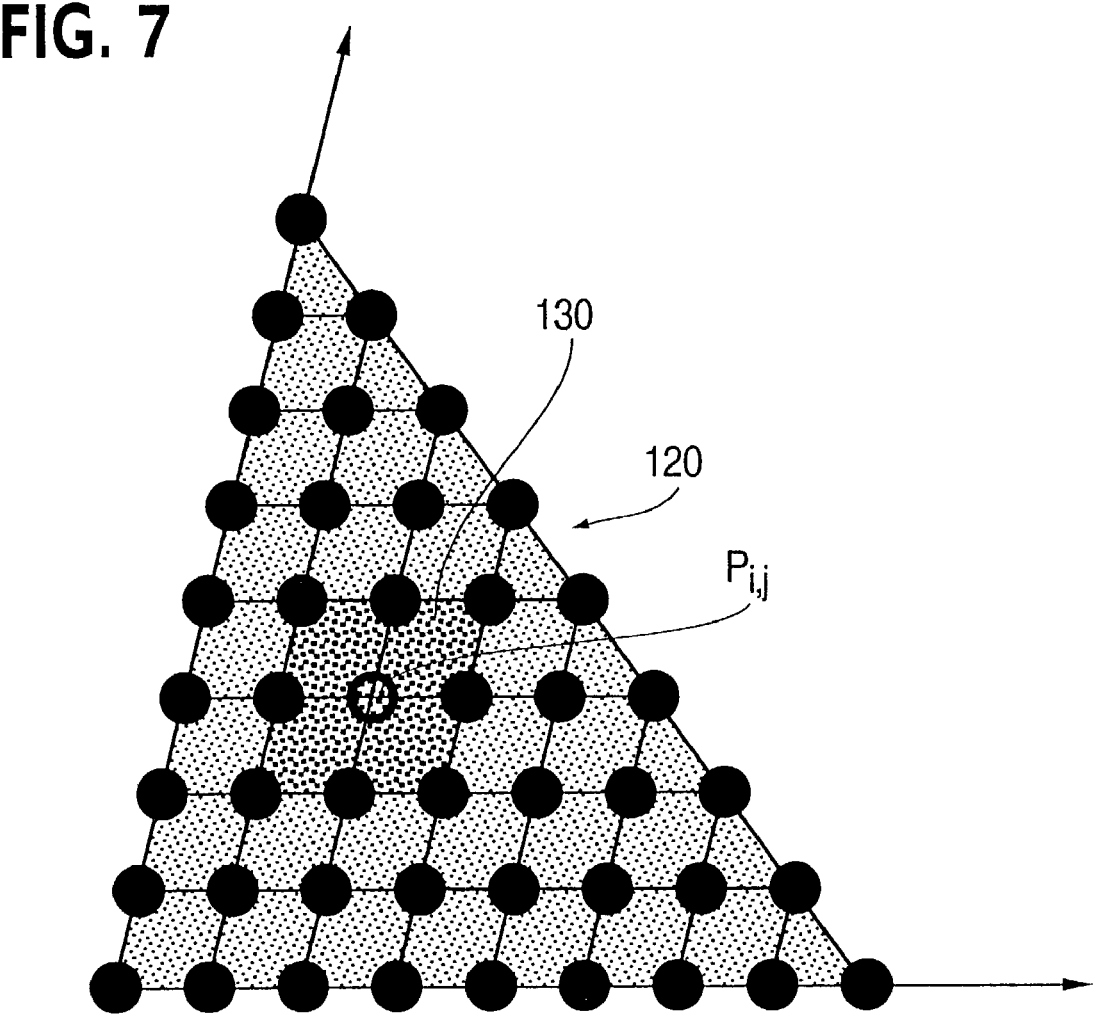
FIG. 7 shows triangle 120 with sample point $P_{i,j}$ that has a local neighborhood 130.

FIG. 7 shows triangle 120 with sample point $P_{i,j}$ that has a local neighborhood 130. For each sample point $P_{i,j}$, barycentric interpolation is used to compute the rendering attributes and sample the displacement function h. The rendering attributes may be for example texture coordinates and 3D point positions. When the displacement map is only a simple texture, the sampling may involve only a pixel lookup. Sampling complex displacements may require evaluating a full shading network. For each triangle, displacement values may be recorded in separate discretized height maps, where $h_{i,j}=h(P_{i,j})$ for each sample point in the grid of the triangle.

The sampled height map of each triangle is used to analyze in two dimensions displacement features or details of the height field that are in or near the triangle. The height map of a triangle is used to create an initial feature map for the triangle of the height map. A feature map indicates where features are located or oriented in or near a triangle, and includes for each sample point $P_{i,j}$, a feature metric $f_{i,j}$ and a feature orientation $o_{i,j}$. The feature metric $f_{i,j}$ of a sample point indicates whether there is enough detail at the sample point to justify using the sample point as a vertex when triangulating the feature points into a final surface mesh. The feature orientation $o_{i,j}$ of a sample point $P_{i,j}$ is a direction along which the feature point might be adjusted within the triangle (possibly off axis to the regular sampling grid) to better capture detail.

The feature metric $f_{i,j}$ for a sample point $P_{i,j}$ is a metric that indicates or measures how important point $P_{i,j}$ is for representing the detail of the displacement map. The feature metric $f_{i,j}$ can be computed from various heuristics, including combinations of derivatives and second derivatives of height field h and height values from the height map of neighboring and nearby sample points. The feature metric $f_{i,j}$ is used to eliminate from the feature map (and therefore from the ultimate displaced mesh) any points that do not add sufficient features or detail.

In a preferred embodiment, feature metric $f_{i,j}$ of a sample point $P_{i,j}$ is a sum of approximate second derivatives of the displacement function h in different directions emanating from $P_{i,j}$. The second derivative h" is the local curvature or degree of curvature at a point of h. At a point $P_{i,j}$, $h_{i,j}$" equals or approaches zero when the height function around $P_{i,j}$ is locally flat. For such sample points, $f_{i,j}$ of $P_{i,j}$ is small or zero, and the point $P_{i,j}$ may be discarded or ignored as a feature point because it is not an important vertex for representing detail of the displacement map. The second derivative h" can be approximated in one dimension using equation (1), Taylor's series:

$$h''(x) \approx \frac{h(x + \Delta x) + h(x - \Delta x) - 2h(x)}{(\Delta x)^2} \quad (1)$$

Figure 8:
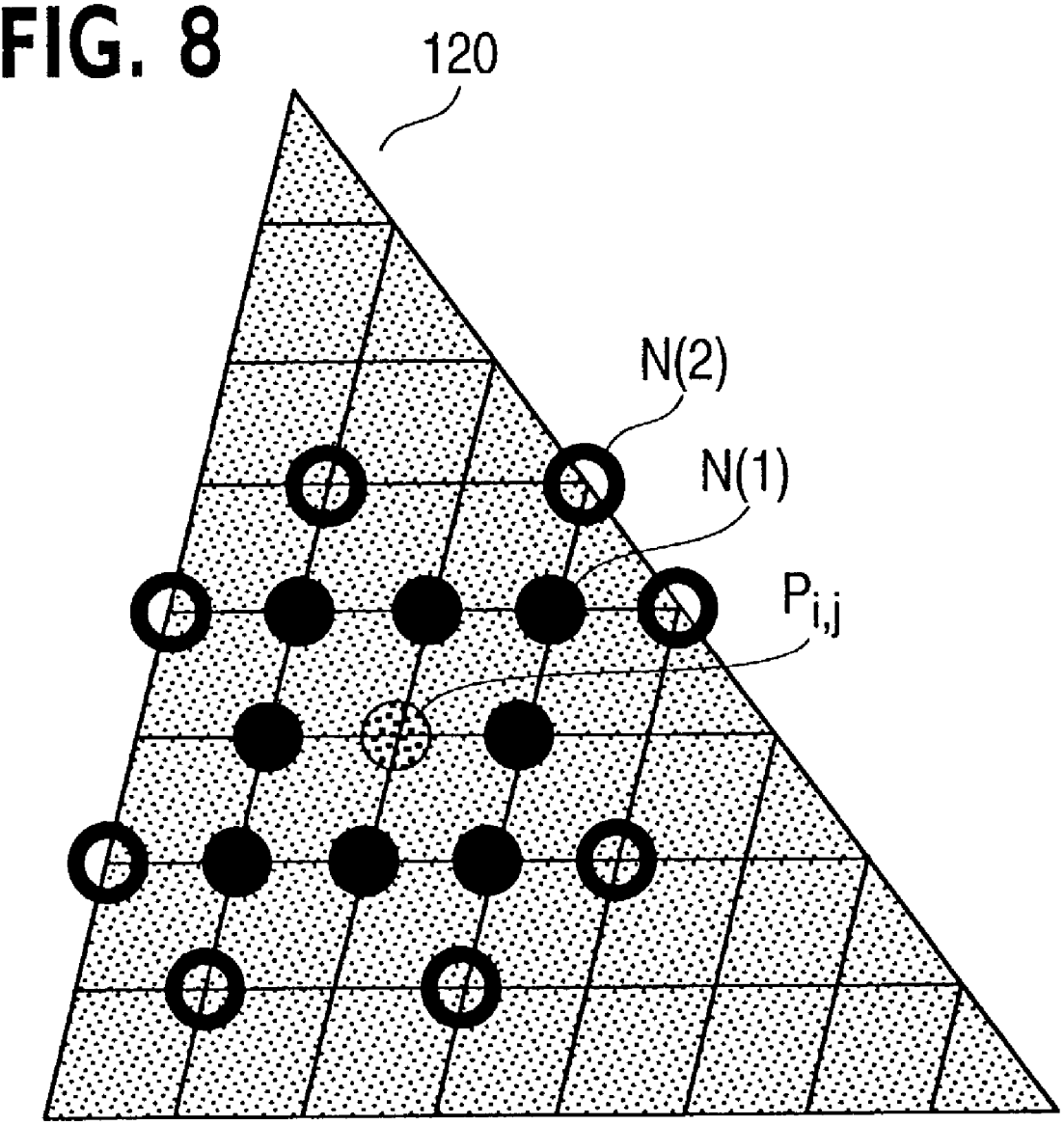
FIG. 8 shows triangle 120 with a sample point $P_{i,j}$ (gray) having neighboring points N(1) (hollow) and N(2) (black).

FIG. 8 shows triangle 120 with a sample point $P_{i,j}$ (gray) having neighboring points N(1) (hollow) and N(2) (black). The height map values of neighborhood points N(1), N(2) of $P_{i,j}$ are used to calculate $f_{i,j}$ at $P_{i,j}$. Local areas, or neighborhoods, of a point $P_{i,j}$ are defined and used to determine the local curvature feature metric of the point $P_{i,j}$. Informally, a neighborhood N(d) of $P_{i,j}$ is defined to be the set of grid points that are within d units or less of $P_{i,j}$ and are not on any line that connects $P_{i,j}$ to a point of N(d−1). For example, FIG. 8 shows $P_{i,j}$ as the center shaded point. In FIG. 8, the N(1) neighborhood of $P_{i,j}$ consists of the set of eight black points around $P_{i,j}$, and the N(2) neighborhood is the set of hollow points. The corners of the parallelogram (not shown) delineated by the hollow points are not included in N(2) because they are aligned with $P_{i,j}$ and the corner points of neighborhood N(1). Formally, a neighborhood of a point $P_{i,j}$ is defined as: N(d)={$P_{i+k,j+l}$,|k|<d,|l|<d,k∧l=1}, where k∧l is the greatest common divisor of k and l. Points in N(d) are discretely addressable.

Figure 9:
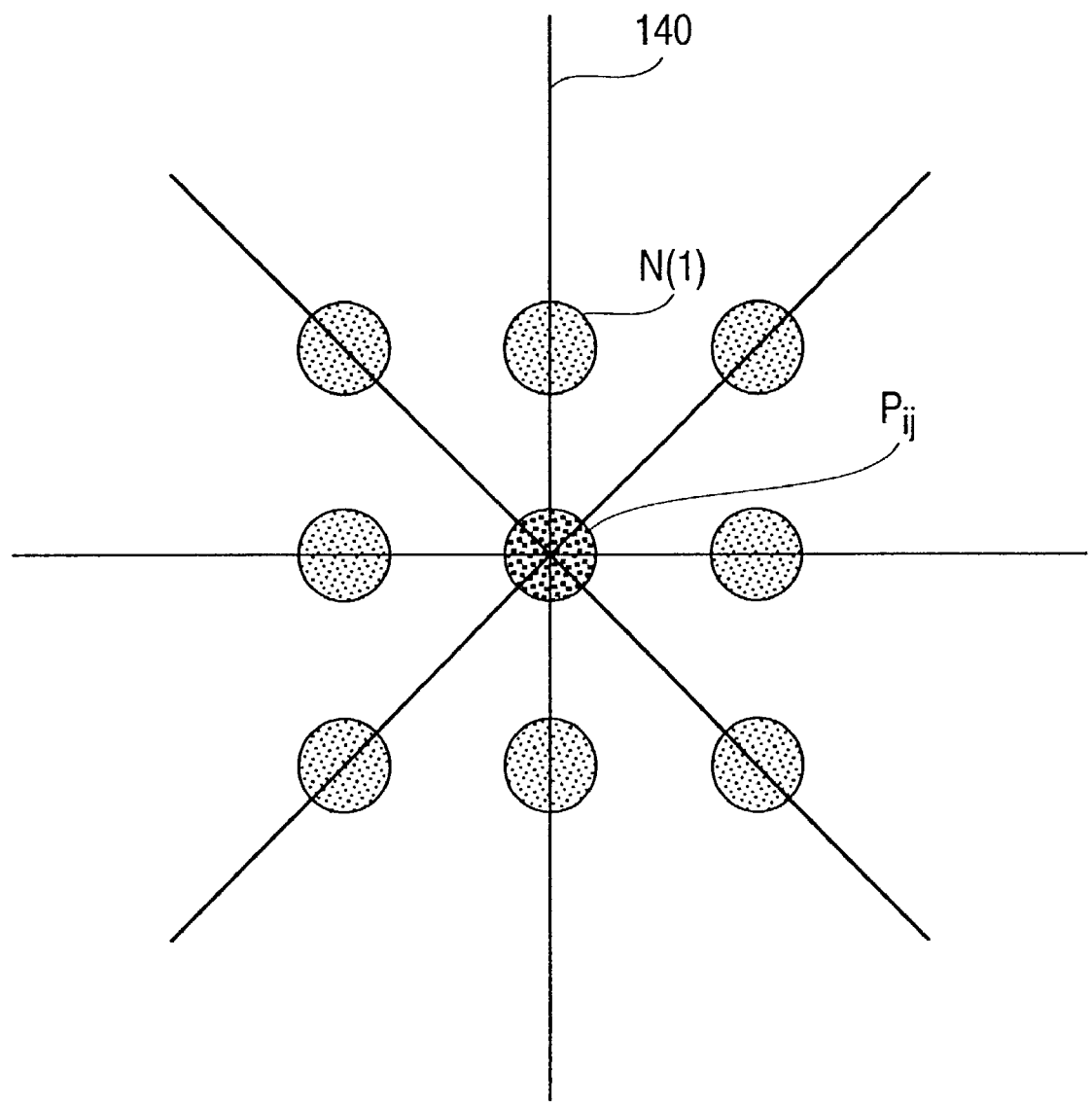
FIG. 9 shows four lines 140 defined by $P_{i,j}$ and its N(1) neighborhood.

FIG. 9 shows four lines 140 defined by $P_{i,j}$ and its N(1) neighborhood. Preferably, point $P_{i,j}$'s feature metric $f_{i,j}$ is computed by summing the four Taylor approximations of $h_{i,j}"$, at $P_{i,j}$ in the directions of the four lines 140 through $P_{i,j}$ that intersect pairs of opposing points in N(1), using for each direction the height map values for the corresponding opposing points. The feature metric calculation may be described mathematically with equation (2):

$$f_{i,j} = c_{1,0} + c_{0,1} + \frac{1}{2}(c_{1,-1} + c_{1,1}), \quad (2)$$

where $c_{k,l} = |h_{i+k,j+l} + h_{i-k,j-l} - 2h_{i,j}|$

As previously noted, the value of $f_{i,j}$ of a point $P_{i,j}$ indicates or is a measure of how important $P_{i,j}$ is to representing or depicting details in the height field or displacement map. Low or zero feature metric values indicate corresponding sample points in the triangle that are in locally flat or planar regions of the height map, and which therefore tend not to be important or necessary to depict or represent detail in the height map. Therefore, while calculating the feature map of a triangle, sample points with a feature metric equal or close to 0 are preferably discarded. Other thresholds or criteria may be useful, according to the circumstances.

In practical applications, it is often desirable to adjust the level of detail in a displacement map that will be reflected in the final mesh. For example, when a height function is a procedural fractal texture that has mathematically infinite detail, there is a need to select a level of detail of the texture, e.g. coarse, granular, or smooth. A threshold may be set, and if a point in a triangle represents a level of detail below the threshold, then it may be discarded, thereby further reducing the number of points in the mesh without significantly affecting the representation or portrayal of the desired level of detail.

Detail-level thresholds for displacements are preferably ratios of global maximums of feature heights and feature gradients of all of the triangles. In practice, it is preferable, while computing the height maps and feature maps, to track and store the global maximum height difference $h_{max}$ of the height maps, and the maximum feature metric value, or maximum feature magnitude $f_{max}$, of the feature maps. The global maximum height difference $h_{max}$ is the maximum difference in height between adjacent points in a height map. The maximum feature metric value $f_{max}$ is simply the largest global feature metric of the feature maps. These global maximums may be used to determine detail-level thresholds, for example by using a ratio r∈[0,1], which may be defined by a user to scale the global maximums.

The thresholds may be used to adjust the level of detail by discarding points that fall below the threshold, e.g. points that represent small or low levels of noise, or relatively locally smooth or planar areas of the displacement map. A detail-level threshold may also be used to reduce small noise by discarding all candidate feature points with an average height difference in N(1) that is smaller than r $h_{max}$. This reduces small noise and eliminates points not adding significant detail by discarding points with a feature metric lower than a generally small percentage of $f_{max}$. These points can be eliminated to significantly reduce the total number of points in the mesh without significantly affecting the detail of the height map. This elimination keeps the number of sample points low while still capturing precisely the shape and detail of the features.

Figure 10:
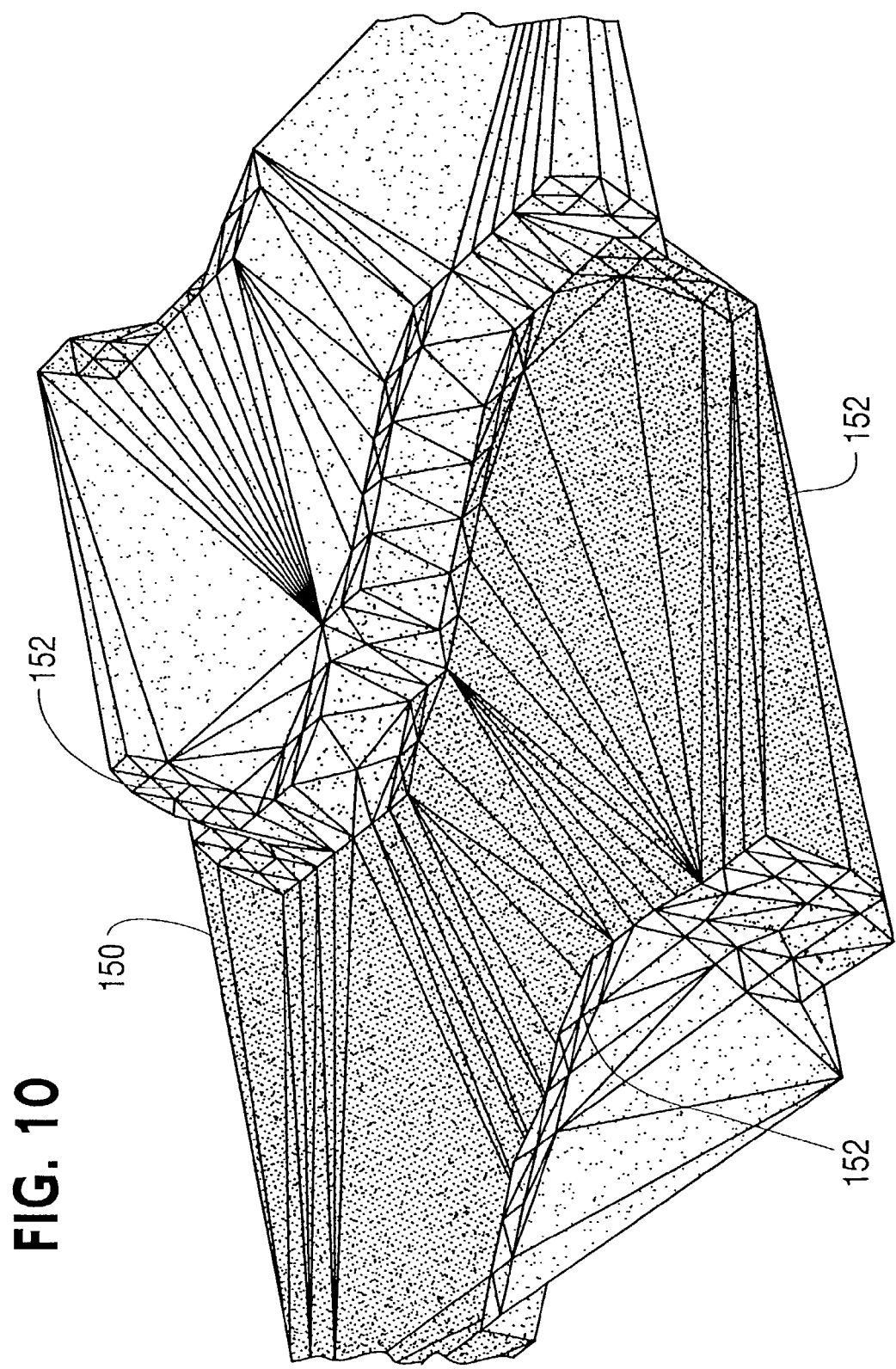
FIG. 10 shows a surface 150 generated with triangles that have had sample points removed based on their feature metric, but where the triangles have not been feature-adjusted.

FIG. 10 shows a surface 150 generated with triangles that have had sample points removed based on their feature metric, but where the triangles have not been feature-adjusted. The zipper effect artifact 152 visible along the edge of the "cliffs" in FIG. 10 is caused by the finite sampling density in each triangle. Refining the sampling density of the grid does not help to capture features that are not aligned on a grid; they do not coincide with any sample points generated up to this point. Even a refined grid may produce visible artifacts, although at smaller scales. These artifacts may be eliminated or reduced by adjusting sample points using a feature orientation.

Figure 11:
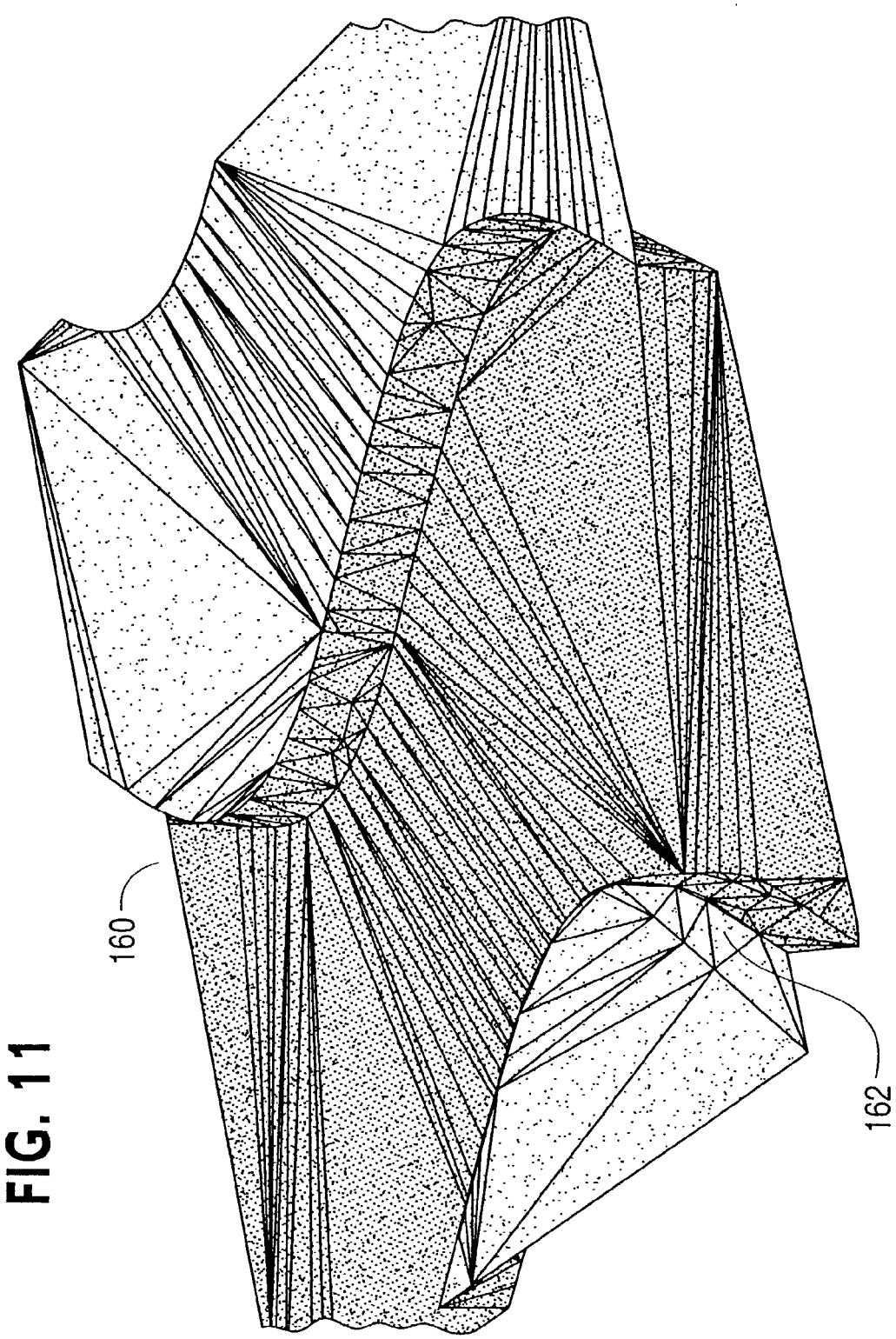
FIG. 11 shows a surface 160 generated with triangles used to generate FIG. 10, but with feature points adjusted (added and moved) based on features located with feature orientations.

FIG. 11 shows a surface 160 generated with triangles used to generate FIG. 10, but with feature points adjusted (added and moved) based on features located with feature orientations. Area 162 exhibits less zipper effect than area 152 if FIG. 10. The surface 160 in FIG. 11 was generated using constrained triangulation discussed in detail further below. Because of the feature point adjustment, the surface 1600 lacks artifacts 152 in FIG. 10, and more accurately represents the displacement.

After the feature map of a triangle is calculated, and preferably after some low-detail points in the height and feature map have been eliminated accordingly, the height maps are used to calculate feature orientations $o_{i,j}$ for points $P_{i,j}$ in the triangles. The feature orientations may be added to the feature maps. Generally, a sample point $P_{i,j}$'s feature orientation $o_{i,j}$ is the direction from the point to a nearby feature or detail in the displacement map. More specifically, in a preferred embodiment, the feature orientation $o_{i,j}$ of a sample point $P_{i,j}$ is the direction from the sample point that has the greatest approximate rate of height change. In other words, a feature orientation $o_{i,j}$ is a direction from a sample point $P_{i,j}$ to a feature or feature detail in the height field that is near the sample point. Any method defining a function f from a height field, and a preferred direction o can be used, and is not restricted to any specific formula for f or o. More generally, the present invention can use a height field to find features and their directions, whatever the calculations or formulas may be.

Feature points in a triangle may be adjusted by using the feature orientations to move the feature points or add new ones. Stated another way, after insignificant sample and feature points have been eliminated as discussed above, the feature points identified in the feature map may be adjusted, using the feature orientations $o_{i,j}$, to more precisely capture the displacement shape. Preferably, this adjustment is performed by detecting in the height field high curvature areas and feature edges and then moving or adding feature points accordingly.

Feature point adjustment without first eliminating flattish sample points may be used by itself to displace a surface, however, feature point adjustment is preferably performed in conjunction with or after the elimination of points based on their feature-metric, as discussed above. This approach is preferable because the values in the height map and feature map (e.g. height values of sample points) that are used during the feature-metric processing may also be used for feature orientation adjustment. Furthermore, fewer calculations are necessary because there is fewer points in the triangles to be adjusted based on feature orientation; points have been eliminated by the feature-metric adjustment and or by detail threshold adjustment.

In a preferred embodiment, feature point adjustment starts with calculating the feature orientations for the raw feature points. A feature orientation of a sample point $P_{i,j}$ is the direction from $P_{i,j}$ which preferably has the greatest rate of height change, although other measures may be used to determine vertices, as previously discussed. A discrete gradient computation of h at $P_{i,j}$ may be used for $P_{i,j}$'s feature orientation $o_{i,j}$. Preferably, the sixteen discretized directions of the N(2) neighborhood are used for the computation. This approach is sensitive to discretization errors; the eight N(1) neighbors tend to produce an imprecise direction. Consequently, for points that have a well defined N(2) neighborhood in the triangle, all 16 N(2) directions are used. However, when N(2) of $P_{i,j}$ is not fully contained in a triangle, N(1) may used instead, because testing has shown that it is usually more numerically accurate to ignore missing directions than to extrapolate the height values outside of the triangle. For these non-N(2) sample points, N(1) is contained (well defined) in the triangle, with the exception of those points $P_{i,j}$ that are next to (but not on) the diagonal triangle edge (e.g. line 108 in FIG. 5). These diagonal-adjacent points have N(1) neighborhoods with one point outside the triangle. For these neighborhoods, the discrete gradient in the direction of the missing neighborhood point may be estimated by using the average of the two discrete gradients in the direction of the two N(1) neighborhood points that lie on the edge. Feature orientation is generally not needed or calculated for points on triangle edges.

By using least squares minimization, a linear function is fit to the 16 samples $h_{i,j}$ (or $f_{i,j}$) of N(2) (or the 8 samples of N(1), as the case may be). A linear function is fit to the samples $h_{i,j}$ around $P_{i,j}$, weighted by the inverse of their distance. The gradient of this linear function is proportional to formula (3):

$$o_{i,j} = \frac{1}{16} \sum_{(k,l) \in N(2)} (h_{i+k,j+l} - h_{i,j}) \frac{1}{\sqrt{k^2+l^2}} \binom{k}{l} \quad (3)$$

The formula above is for points with well-defined N(2) neighborhoods in the triangle. For those points $P_{i,j}$ using neighborhood N(1), the equation sum is divided by 8 rather than 16, and k and l are elements of N(1) rather than N(2). For those points $P_{i,j}$ with a point of N(1) outside the triangle, the summation term for that missing point is estimated using $$\frac{1}{2}(h_{i,j+1} + h_{i+1,j}),$$

rather than $(h_{i+k,j+l} - h_{i,j})$.

Figure 13:
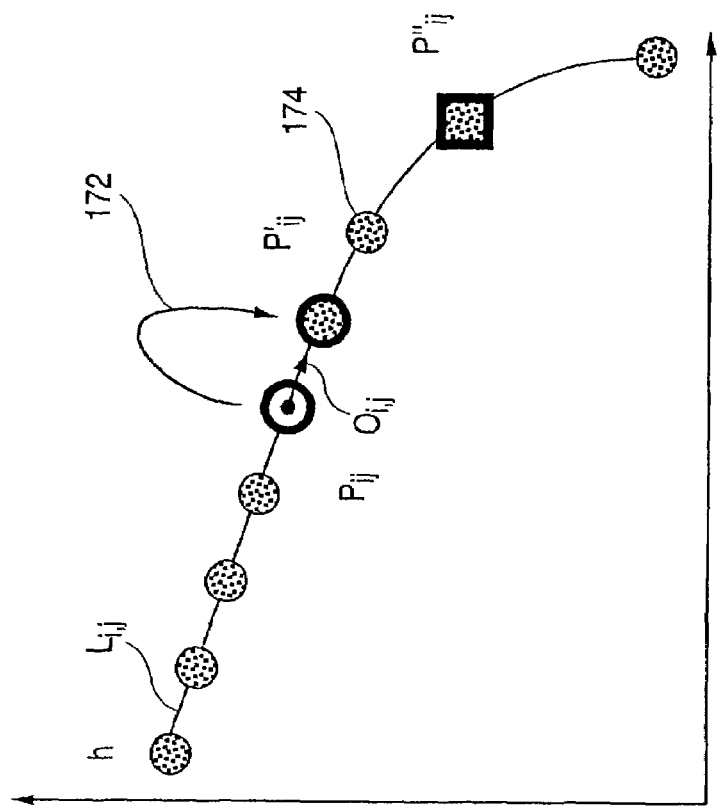
FIG. 13 is a profile view of FIG. 12, showing the curvature of line $L_{i,j}$ in the height field with points corresponding to those in FIG. 12.
Figure 12:
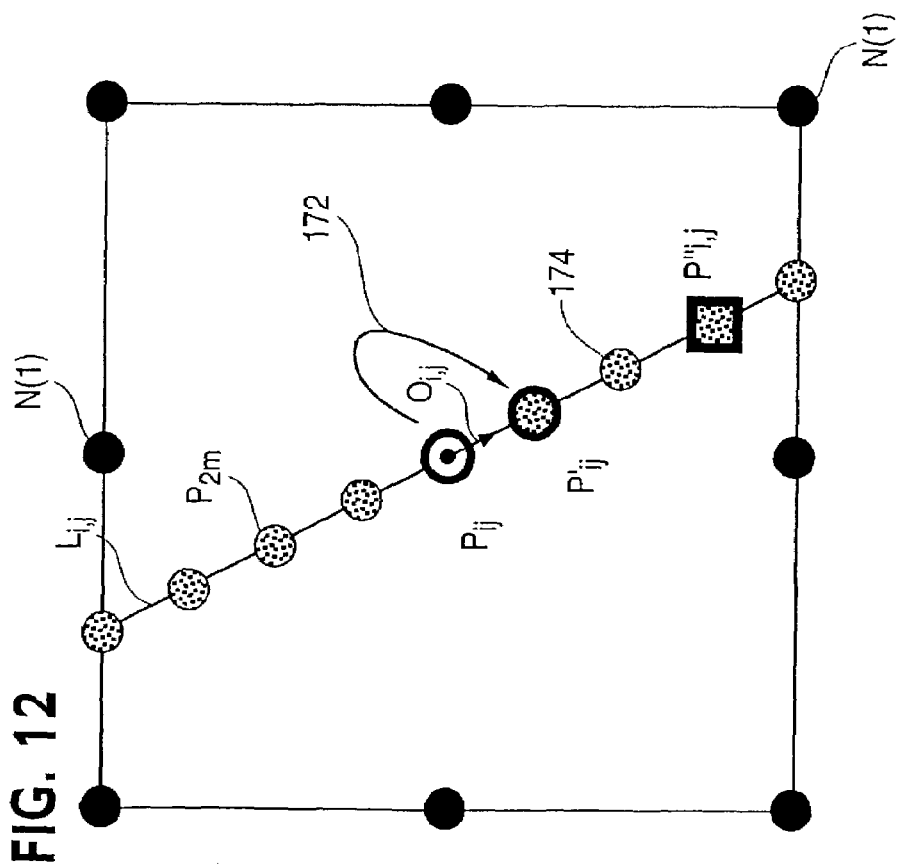
FIG. 12 is a view above sample points in a triangle, showing the 8 neighborhood points N(1) (peripheral solid points) of sample point $P_{i,j}$, and a line segment $L_{i,j}$ which passes through the sample point $P_{i,j}$ in the direction of $P_{i,j}$'s feature orientation $o_{i,j}$, and on which are shown; the original position of the sample point (hollow circle $P_{i,j}$), the 2m (8) height samples (grey points $P_{2m}$), two of which are the adjusted location of $P_{i,j}$ (gray circle $P'_{i,j}$) and the sample point added at an extrema of line $L_{i,j}$ (gray square point $P''_{i,j}$).

Feature orientations are used to adjust the feature points. FIG. 12 is a view above sample points in a triangle, showing the 8 neighborhood points N(1) (peripheral solid points) of sample point $P_{i,j}$, and a line segment $L_{i,j}$ which passes through the sample point $P_{i,j}$ in the direction of $P_{i,j}$'s feature orientation $o_{i,j}$, and on which are shown; the original position of the sample point (hollow circle $P_{i,j}$), the 2m (8) height samples (grey points $P_{2m}$), two of which are the adjusted location of $P_{i,j}$ (gray circle $P'_{i,j}$) and the sample point added at an extrema of line $L_{i,j}$ (gray square point $P''_{i,j}$). FIG. 13 is a profile view of FIG. 12, showing the curvature of line $L_{i,j}$ in the height field with points corresponding to those in FIG. 12.

Starting with line $L_{i,j}$, which passes through $P_{i,j}$ in the direction of feature orientation $o_{i,j}$ and is bounded by the neighborhood N(1), 2m height sample points ($P_{2m}$) may be taken uniformly along $L_{i,j}$. A locally flat area around the sample point $P_{i,j}$ is checked for by using equation (1) to approximate h" for $P_{i,j}$ and the 2m samples along line $L_{i,j}$. When h"($P_{i,j}$) is below a threshold, it is moved or adjusted along $L_{i,j}$ to the closest of the 2m points that has a sufficiently large second derivative (i.e. above the threshold). In other words, if $P_{i,j}$ is in a locally flattish area (its h" in the direction of its $o_{i,j}$ is small), then it is moved along $L_{i,j}$ to a sample point $P'_{i,j}$ (chosen from among the 2m points) which has a less flattish (larger h") local area. Arrow 172 in FIGS. 12 and 13 depicts a movement of $P_{i,j}$ to $P'_{i,j}$.

Figure 14:
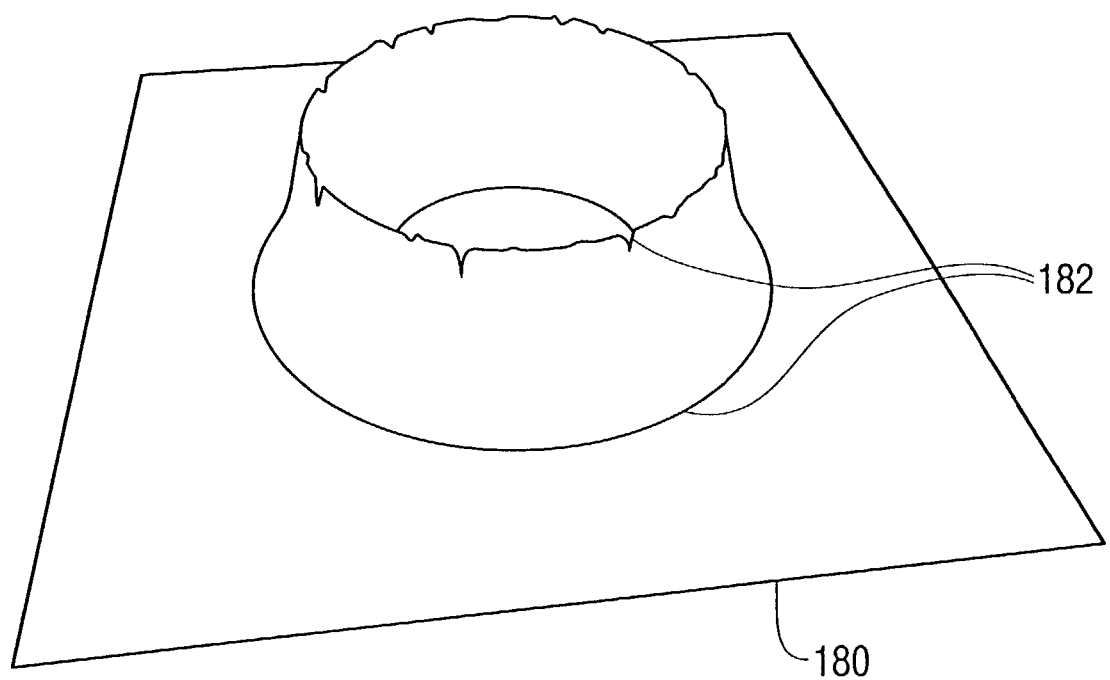
FIG. 14 shows a plane surface 180 displaced with a ring texture or displacement map, where feature points in triangles were moved according to their feature orientation but where new feature points were not added at extrema.

FIG. 14 shows a plane surface 180 displaced with a ring texture or displacement map, where feature points in triangles were moved according to their feature orientation but where new feature points were not added at extrema. Artifacts 182 are visible on the top and at the base of the ring. The movement of feature points is not sufficient to capture the top profile of the ring or the curved area along the bottom of the ring. Adding vertices (or feature points) at high curvature locations solves the problem. If the sample point $P_{i,j}$ that is being moved or adjusted happens to be on the edge of a triangle, then it is preferably moved along the triangle edge rather than along $L_{i,j}$, thus preventing cracks or gaps between triangles.

While adjusting a point $P_{i,j}$ using $L_{i,j}$, it is also convenient to introduce new feature points (vertices) at extrema of the second derivative h" along line $L_{i,j}$, as for example point $P''_{i,j}$, shown in FIGS. 12 and 13. An extrema may generally be determined according to h" values along $L_{i,j}$; the greater the h" value for one of the 2m points on $L_{i,j}$, the more likely that it is an extrema candidate.

Figure 15:
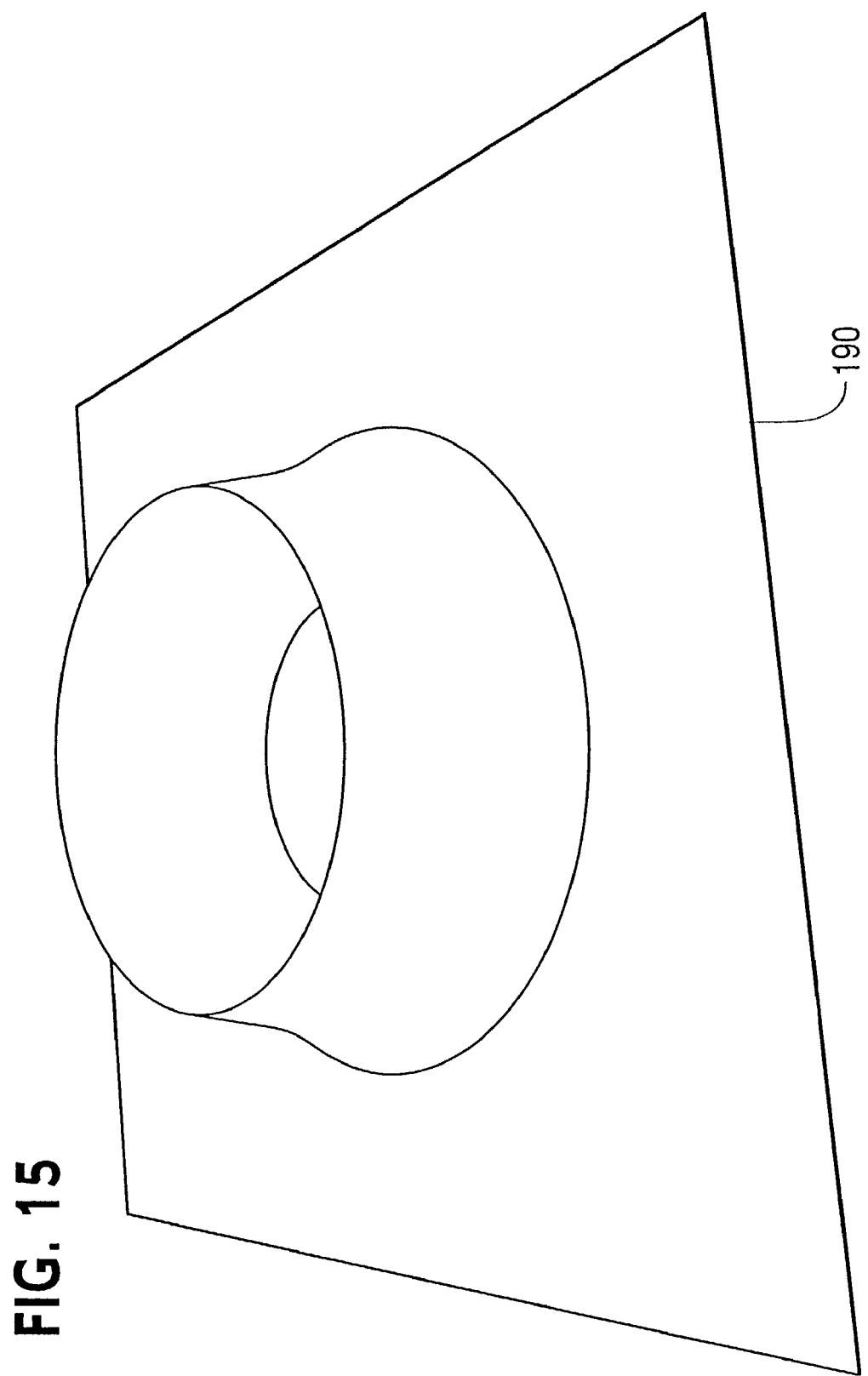
FIG. 15 shows the image of FIG. 14 after vertices have been added to extrema on $L_{i,j}$, thereby improving the representation of the profile and base of the ring.

FIG. 15 shows the image of FIG. 14 after vertices have been added to extrema on $L_{i,j}$, thereby improving the representation of the profile and base of the ring. When the moved and/or new points are not located precisely enough, the adjustment operation can be repeated k times to move or adjust sample points closer to features. In one implementation, this can be a parameter set by the user. The idea is to define n to represent the size of the smaller feature the user does not want to miss, and (k,m) represents the precision of the feature shape. Using k>1 is a way to reach the same precision with a smaller m, and faster computations. In practice k=2 or 3 are the best values. Repetitive adjustment (setting k>1) is preferable to increasing the number m, and quickly reaches the same precision with a small m. A $$\frac{1}{m}$$

smaller search range is used each time the operation is repeated. That is to say, around the shifted sample point progressively smaller segments of $L_{i,j}$ are uniformly sampled. For example, if 8 sample points (m=4) are used in the first iteration (as shown in FIGS. 12 and 13), then on the second iteration the 8 sample points would be uniformly distributed around $P'_{i,j}$ and the distance between the sample points would be ¼th the distance of the first iteration. Continuing the example, in FIG. 12 the segment from point $P_{i,j}$ to point 174 would be uniformly sampled with 8 points. With this method, the effective placement resolution is proportional to triangle size divided by $nm^k$, while using only $O(kmn^2)$ samples, whereas a brute force micropolygon approach would require $O((nm^k)^2)$ samples. New sample points at extrema may or may not be added with each iteration.

The value of m may be set in various ways. The value of m can be set by a user, and the user may divide the original tessellation into regions requiring different m values. Such regions can be determined by painting, graphical delineation, or the like. The value of m can also be determined algorithmically. The value can be determined based on the point of view, a feature size of the displacement map, and other context sensitive factors. The value of m can therefore vary from one triangle to the next, according to necessity. The number of sample points can also be determined using a preferred distance between sample points, in which case the value will not be the same for all triangles. For example, a user might specify a distance of 1 millimeter, and m for each triangle would be set to accommodate sample points spaced 1 millimeter apart. The value of m can also be set as a ratio of feature size.

After the feature points (vertices) have been finally determined in the two-dimensional triangles of the original tessellation, the points may be triangulated to create a final mesh surface. For every triangle T, all of the feature points belonging to a triangle are collected. Cracks along shared edges may be prevented by including in the collection of feature points for a triangle feature points that are part of another triangle and yet are located on an edge shared by the other triangle and the triangle being processed, possibly including feature points added to the other triangle by feature-based adjustment.

Figure 16:
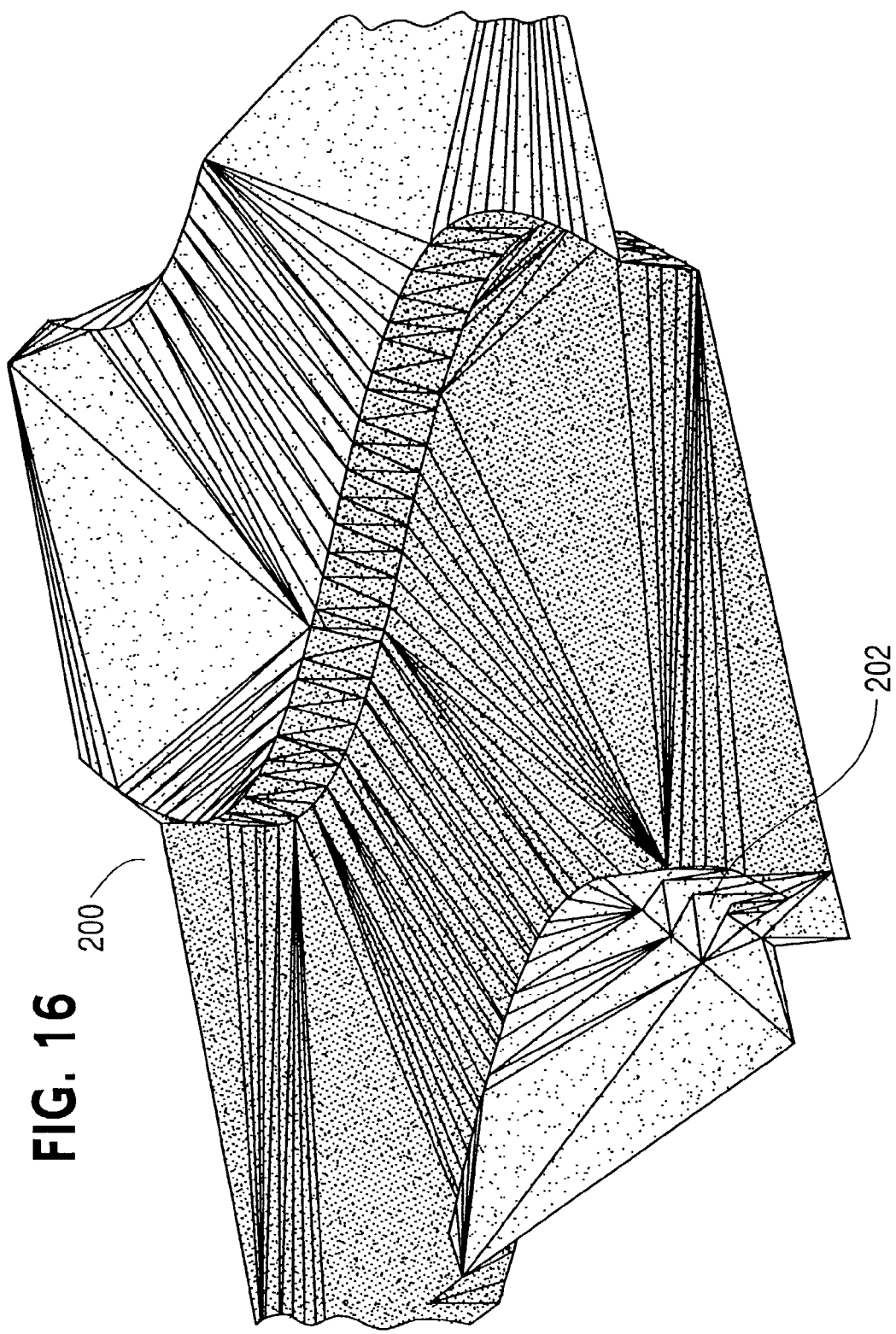
FIG. 16 shows a displaced surface 200 with cracks 202 produced by a standard Delaunay triangulation.

The collected points for a triangle are locally triangulated by inputting their barycentric coordinates to a constrained two-dimensional Delaunay triangulation. The constraints, which may be defined as line segments $\overline{P'_{i,j}P'_{k,l}}$ between adjusted feature points, are a way of taking the height field and its features into account during the triangulation step. FIG. 16 shows a displaced surface 200 with cracks 202 produced by a standard Delaunay triangulation. The cracks in FIG. 16 occur because the unconstrained Delaunay triangulation builds triangles joining high and low points. In other words, the points in FIG. 16 are well located but poorly connected.

Figure 17:
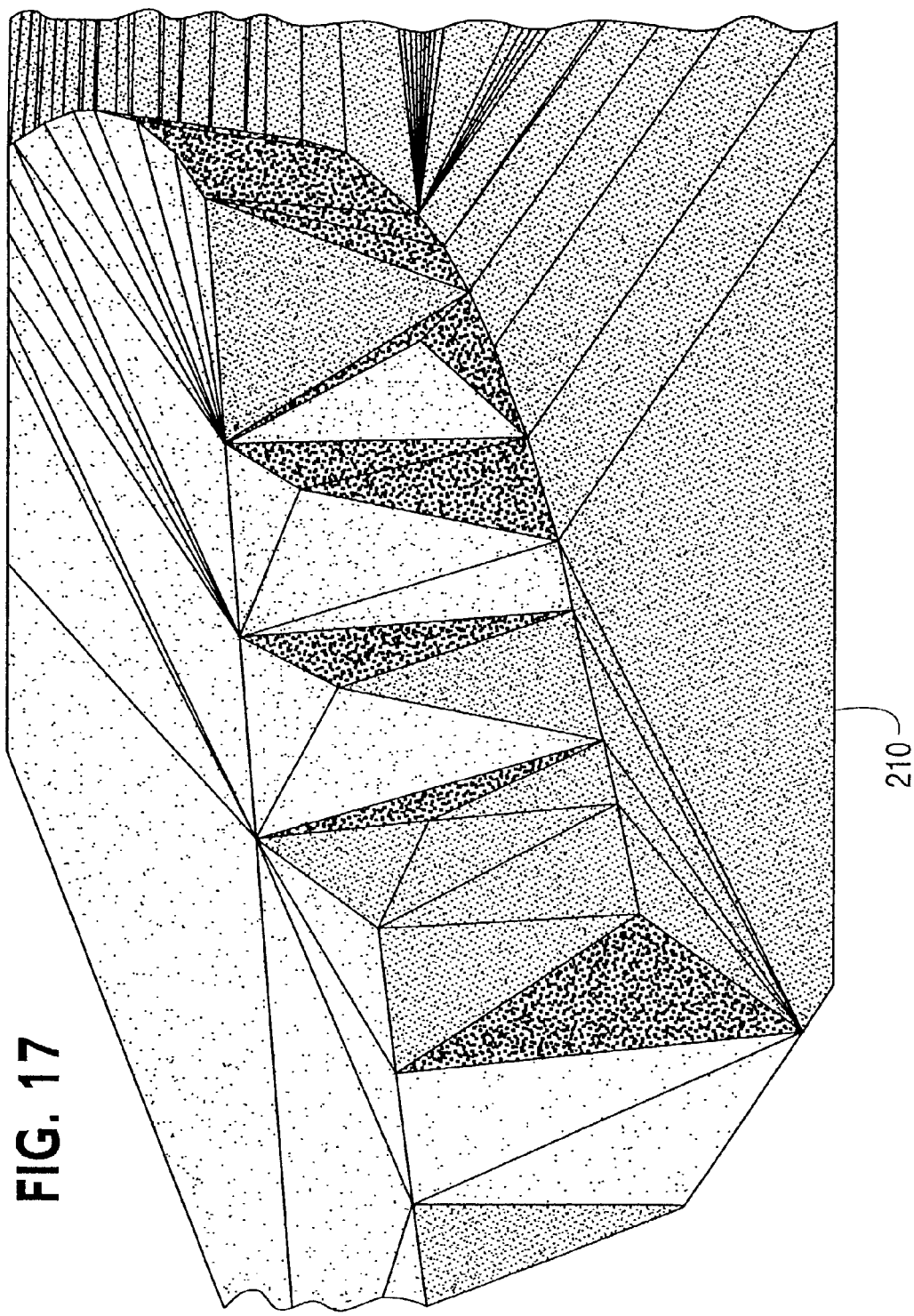
FIG. 17 shows a closer view of the cracks 202 shown in FIG. 16, as seen from another angle.
Figure 18:
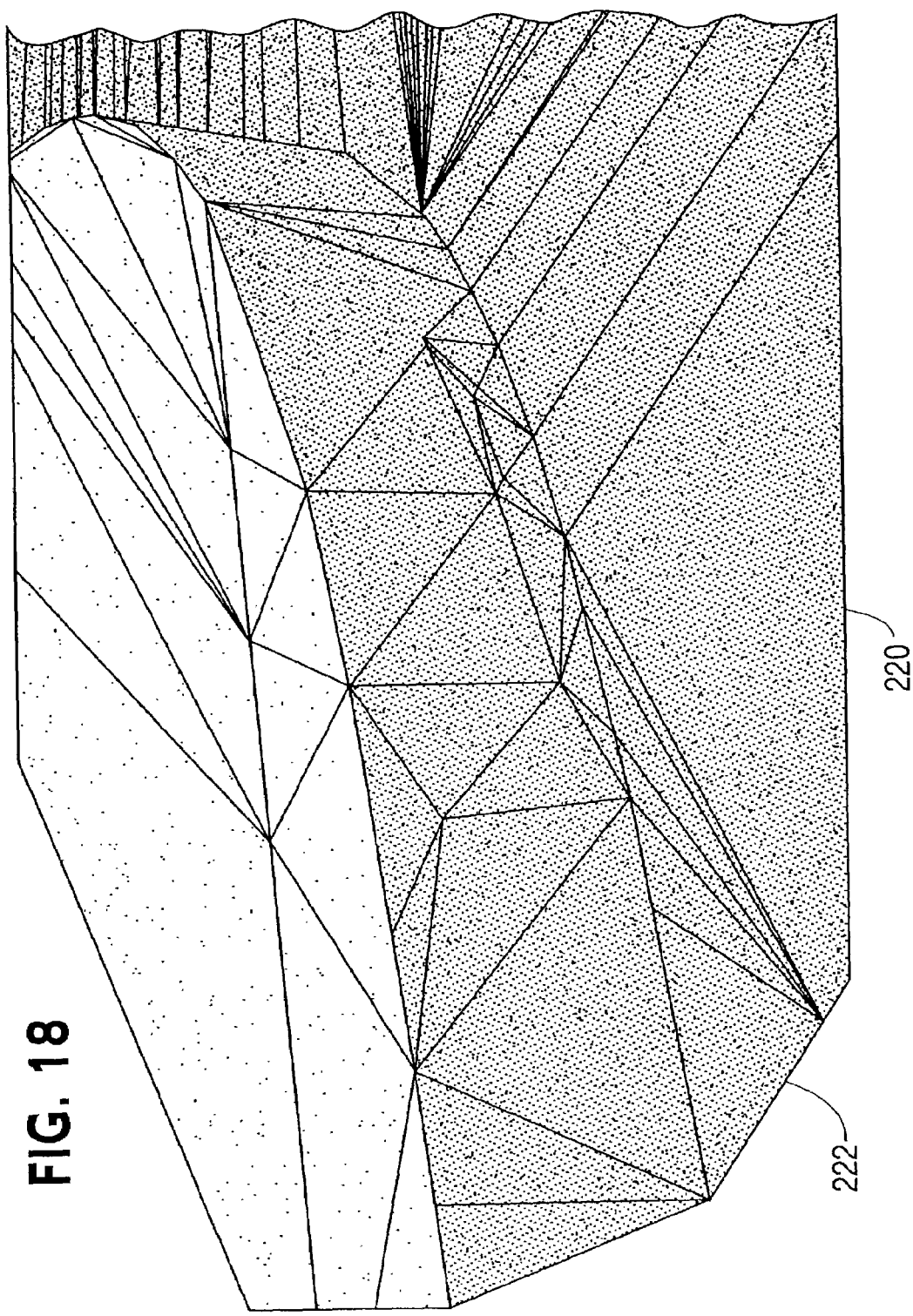
FIG. 18 shows a view of surface 220 with edges 222 (white lines) defined by a feature border.

FIG. 17 shows a closer view of the cracks 202 shown in FIG. 16, as seen from another angle. FIG. 18 shows a view of surface 220 with edges 222 (white lines) defined by a feature border. The cracks 202 produced by a triangulation that joins high and low points can be avoided by forcing the triangulation to include the edges 222 defined by the feature border. These constraining feature borders or edges may be found by, for a feature point, looking for neighbor points in the N(2) set that have, within a small threshold, a height close to the height of $P_{i,j}$. When several points in N(2) match the criteria, the segment of those points (to $P_{i,j}$) that is most orthogonal to the discrete gradient $o_{i,j}$ of point $P_{i,j}$ is selected as a segment of a border edge. This process creates a set of segments that together build contour lines (similar to iso-height lines in a topographic map) that fairly represent the height map. FIG. 18 shows the connectivity hints, or edges 222, drawn as white segments. Delaunay triangulation may then be constrained by the contour lines or edges, thereby avoiding cracks and other artifacts.

The Delaunay triangulation constrained by feature borders creates a set of new triangles $T_i$ to replace the original tessellation triangle T. As a result of adding constraints, the constrained triangulation may introduce new vertices at the segment intersections, if there are any. Accordingly the displacement map must be sampled for these added points. Furthermore, constrained triangulation may create long triangles with poor aspect ratios. These long triangles do not generally produce visible artifacts when they are rendered. However, a more balanced triangulation may be produced by adding more feature points, at a cost of creating more triangles in the triangulation.

Figure 19:
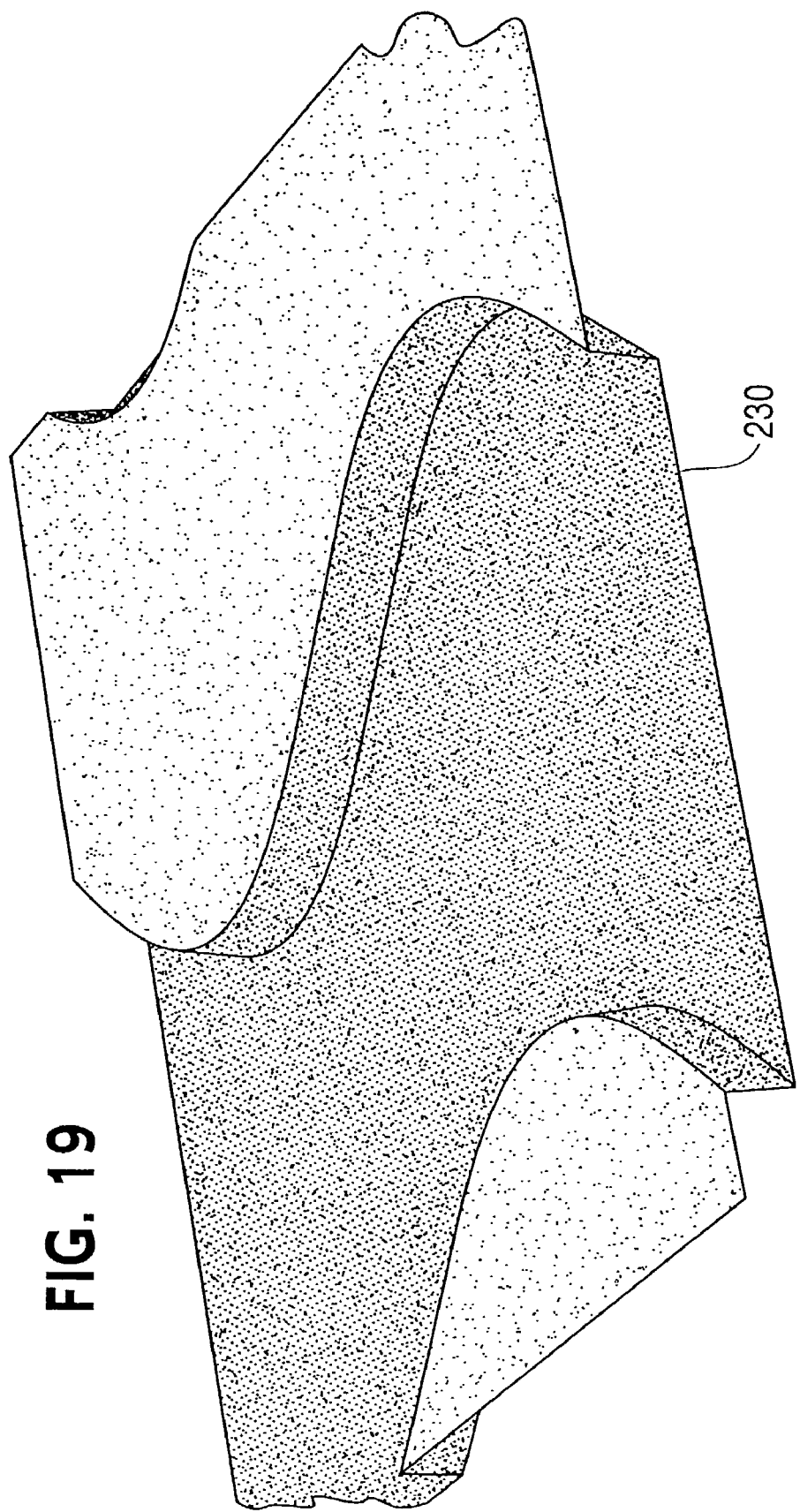
FIG. 19 is a shading 230 of the surface in FIG. 11.

After triangulation, all of the triangles $T_i$ may be built into a single object, as shown for example in FIG. 11. The vertices along the common edges are shared, allowing smooth shading. At this stage, a complete mesh of a displaced surface has been built and vertex normals for the surface may be computed. FIG. 19 is a shading 230 of the surface in FIG. 11. In building the normals of a displaced surface, sharp feature edges, where necessary, are preferably produced by associating multiple normals with each vertex, depending, for a given vertex, on the orientation of the triangles connected to the vertex. A partition of the triangles around a vertex is built by grouping together triangles with similar orientation: two triangles are in the same group if their normals form an angle smaller than a given value $\alpha_0$. Triangle normals are weighted by triangle size, and the normals in a group are then averaged.

Figure 20:
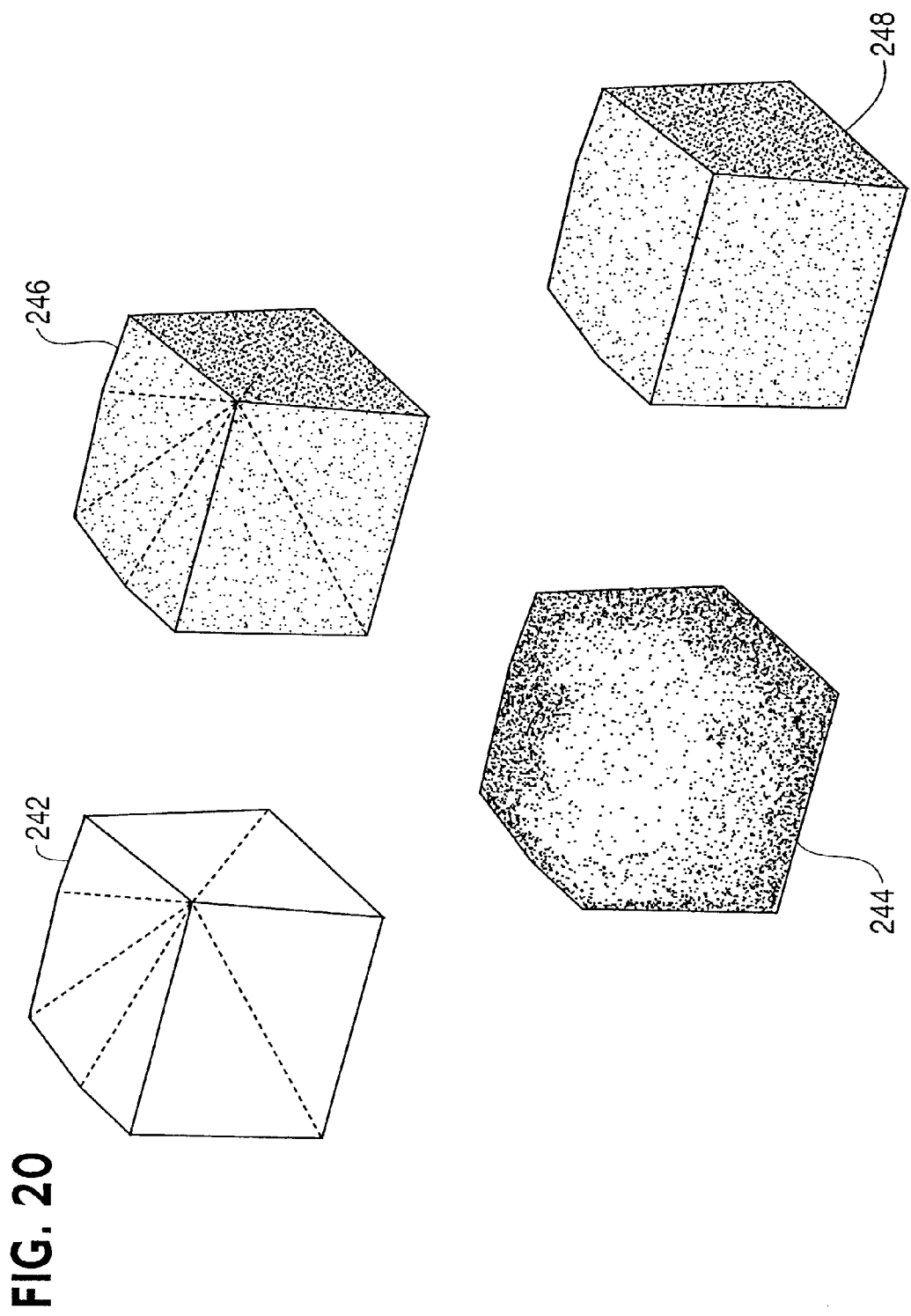
FIG. 20 shows a set of triangles 242, two prior art shadings 244, 246, and a shading of the present invention 248.

FIG. 20 shows a set of triangles 242, two prior art shadings 244, 246, and a shading of the present invention 248. The set of triangles 242 is shown shaded using three techniques. Shading 244 is the result of shading triangles 242 using a single averaged normal at the vertex. Shading 246 is a shading where each triangle has its own normal. The shading of the present invention 248 uses the grouping and weighted average approach discussed above.

Figure 21:
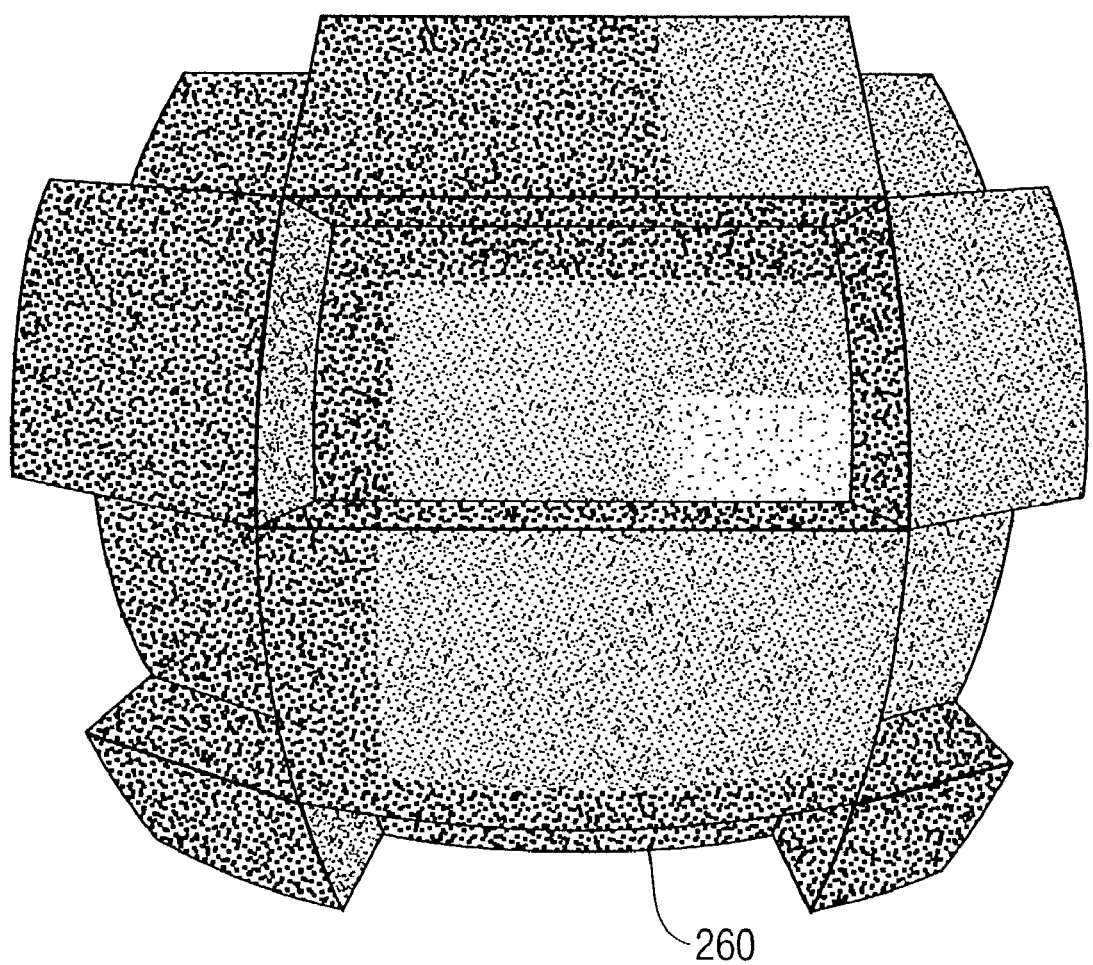
FIG. 21 shows a sphere displaced with a checker texture 260, where all three vertices of a triangle are displaced by the same amount, and where a grouping and averaging approach produce an unsatisfactory shading.
Figure 22:
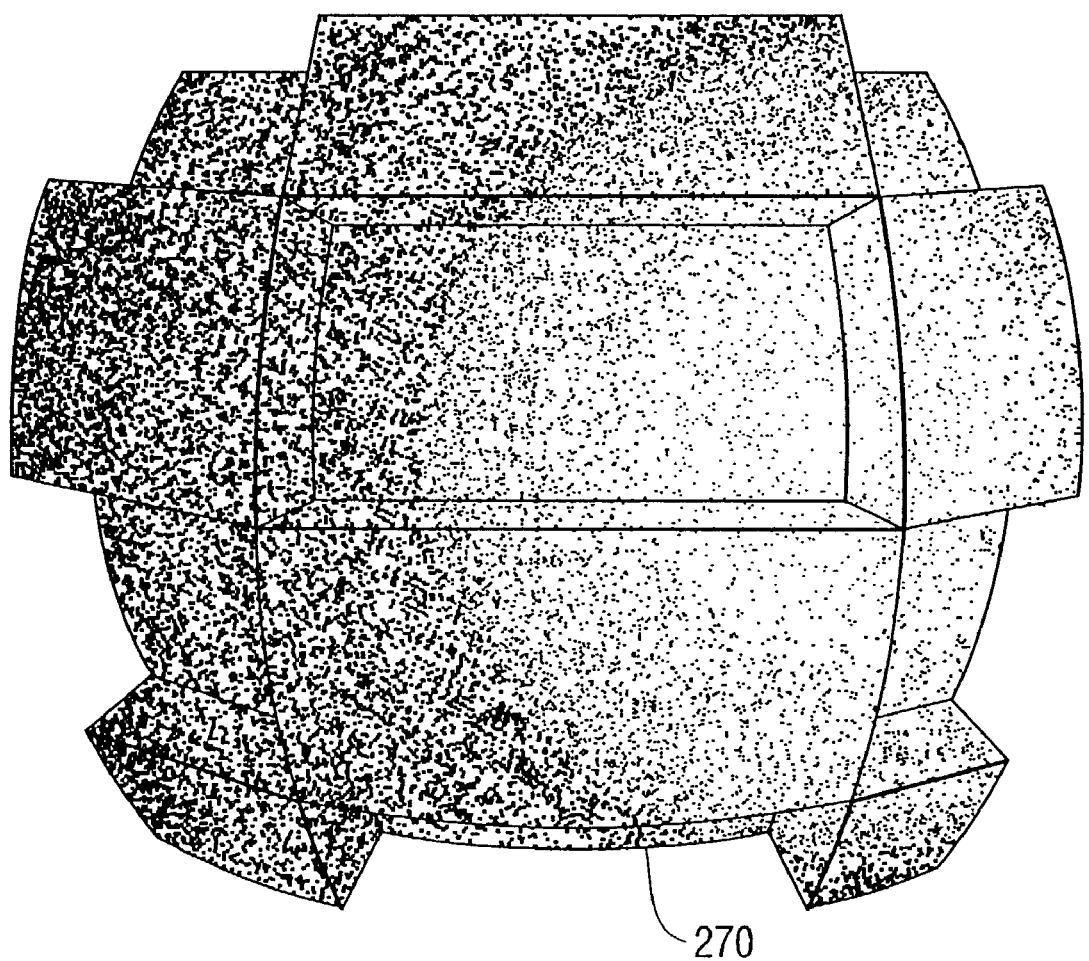
FIG. 22 shows a rendering 270 of the displacement shown in FIG. 21, improved by using the normals before displacement.

FIG. 21 shows a sphere displaced with a checker texture 260, where all three vertices of a triangle are displaced by the same amount, and where a grouping and averaging approach produce an unsatisfactory shading. Because all three vertices of a triangle are displaced by the same amount, the original vertex normal before displacement is more accurate than a triangle normal. FIG. 22 shows a rendering 270 of the displacement shown in FIG. 21, improved by using the normals before displacement.

Figure 23:
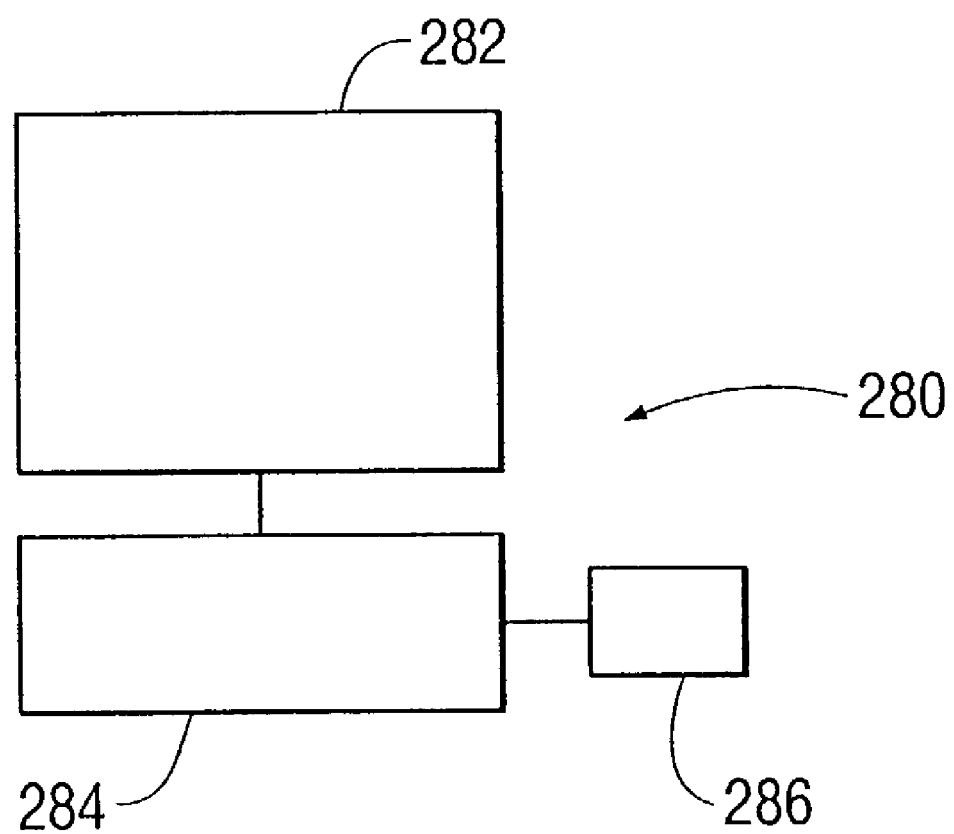
FIG. 23 shows hardware of the present invention.

FIG. 23 shows hardware of the present invention. The present invention is included in a system 280, such as depicted in FIG. 23, which includes a display 282 upon which an output of the present invention may be displayed. A computer 284, preferably of high performance workstation type, performs the processes described herein and an input device 286, such as a mouse or stylus with pad, is used to control functionality described herein. The system 280 also includes storage (not shown), such as disc storage and RAM in which the processes of the present invention can be stored and on which the processes can be distributed. The processes can also be distributed via a network, such as the Internet.

The present invention has been described with respect to displacing and rendering objects by adaptively refining the original object geometry in a user-controllable manner according to the salient features of the displacement map. This approach presents a general solution for displacement mapping in ray-tracing, hardware-accelerated rendering (e.g. for games), or when complete meshes are required. Displacement geometries may also be pre-computed and subsequently used as high-quality geometric objects.

The order of triangle processing can be varied. Each triangle can be fully processed in turn, one after the other, where each triangle is in turn height-mapped, feature-mapped, and triangulated. Also, all triangles can be height-mapped, then all are feature-mapped, then all triangulated into a final surface mesh. Triangles may also be processed in parallel. Furthermore, it is possible to process a triangle taking into account features of a neighboring triangle that has already been processed. These approaches can also be used in combination.

The present invention may also be used to sculpt objects with paint-based techniques. With hardware acceleration, it is possible to paint a displacement map onto an object, whereby the geometry of the object adapts in real-time to changes in the map.

In cases where the inverse parametric map between texture space and object space is known, for example a uv-mapped file texture, it is beneficial to perform feature analysis directly in texture space and back-project the result to object space. In addition to using a threshold to detect features, it is also efficient to use error accumulation along a Peano curve, or to use a probabilistic approach.

Although the invention has been described with uniform sampling, the sampling may also be non-uniform. For example, sampling may be driven by triangle size or aspect ratio. View dependent criteria may also be introduced to define and adjust the feature points.

Although processes of the invention have been described using neighborhoods N(1) and N(2), other sets of points for neighborhoods may also be used. Neighborhoods can be chosen dynamically, etc.

Although f and o have been defined with reference to an embodiment discussed above, f and o may be computed with other formulas or algorithms.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of defining a surface of a model, comprising:
   sub-sampling the surface at a higher rate or resolution than the rate or resolution of an original sampling of the surface using generated sample points;
   determining automatically sample points that add detail to the surface when displaced by a displacement map, the map being applicable to points of any arbitrary surface, by using a local criteria calculated based on displacements of neighboring sample points by the displacement map; and
   increasing automatically a resolution of the area of the model by keeping the determined sample points and discarding other sample points.

2. The method according to claim 1, further comprising moving determined sample points to increase detail represented thereby.

3. The method according to claim 1, wherein the moved sample points are moved toward a feature of the displacement map.

4. The method according to claim 1, wherein the local criteria comprises a feature metric measuring a local feature within a locality of the sample points displaced by the displacement map.

5. The method according to claim 2, wherein said moving comprising moving a determined sample point toward a direction of a high rate of change according to the displacement map.

6. The method according to claim 1, wherein said determining comprises determining that sample points are points of significant curvature.

7. The method according to claim 1, further comprising preferentially connecting vertices of the polygons of the surface along one of edges and borders of a sampled area of the surface.

8. The method according to claim 7, wherein the polygons are triangles and wherein vertices of the triangles are feature points.

9. The method according to claim 1, wherein the model is a polygon mesh model.

10. A method of defining a surface comprising automatically refining a representation of a surface by generating sample points sampling the surface at a given sample rate higher than an original sampling rate adding surface detail, for sample points automatically determining one of a location and a direction of a local feature from a displacement map applied to sample points, and either moving or discarding sample points according to the location or direction of the local feature, the map being applicable to points of any arbitrary surface.

11. A method of creating a model, comprising:
uniformly sampling the model at a given sample rate or resolution higher than an original sampling rate adding model detail;
identifying automatically areas of details and features of sample points of the sampled model as displaced by a displacement map, the map being applicable to points of any arbitrary surface; and
increasing representation of the sampled model by discarding some sample points according to the areas of details or features and moving other sample points according to the areas of details or features.

12. A method of obtaining a surface that has been sampled at a given rate higher than an original sampling rate adding surface detail, comprising automatically deriving local feature criteria of the sample surface according to a displacement map thereof and using the local feature criteria to automatically determine which sample points of the surface to keep for displacement by the displacement map and only keeping the so-determined sample points for displacement by the displacement map, the map being applicable to points of any arbitrary surface.

13. A computer-implemented method of displacing a parameterized surface comprised of subdivisions, the method comprising:
generating two-dimensional height maps for a subdivision surface by sampling a height field at a given resolution to calculate height values for points in the subdivision, the height field being applicable to points of any arbitrary surface;
generating two-dimensional feature maps, for the subdivisions, that identify features of the height field, by using the height map and height field to calculate approximate degrees and directions of local curvature.

14. A computer-implemented method of creating a surface, comprising:
approximating a surface with sample points sampling the surface at a given resolution higher than an original sampling rate adding surface detail;
using a displacement function to compute a height of a sample point and heights of sample points in a local neighborhood of the sample point, the function being applicable to points of any arbitrary surface;
deriving feature criteria for the sample points using local change in the heights;
representing the surface with the sample point when the feature criteria indicates that the local neighborhood is not substantially flat; and
representing the surface without the point when the feature criteria indicates that the local neighborhood is substantially flat.

15. A computer-implemented method of creating a surface, comprising:
approximating a surface with sample points sampled at a given sample rate higher than an original sampling rate adding surface detail;
using a displacement function to compute a height of a sample point and heights of sample points in a local neighborhood of the point, the function being applicable to points of any arbitrary surface;
using the heights to obtain a criteria of local change in the local neighborhood;
representing the surface without the sample point when the criteria of local change indicates that the point is not a feature point of the local neighborhood; and
representing the surface with the point when said criteria of local change indicates it is a feature point.

16. The method according to claim 15, further comprising using the heights to approximate a gradient for the point if its local change criteria indicates that it is at a point of local change among the heights, and repositioning the point to a location in the direction of the gradient.

17. The method according to claim 16, further comprising adding a new point in the neighborhood at an extrema in the local neighborhood in the direction of the gradient.

18. A computer-implemented method of displacing a surface, comprising:
identifying features in local neighborhoods of points in a range, the range resulting from a displacement map applied to a domain comprising sample points of a given resolution or rate approximating the surface, the features comprising locations or directions of detail in the range of the displacement map, the map being applicable to points of any arbitrary surface;
adjusting at least some points in the range, or corresponding points in the domain according to the locations or directions of the features;
identifying borders of features in the range of the displacement map; and
making a displaced surface mesh by using the borders to constrain a triangulation of the adjusted points.

19. A computer-implemented method of displacing a surface, comprising:
deriving a set of points for triangles in a tessellation of the surface, by
sampling the surface at a given rate or resolution to create a distribution of sample points in a triangle,
calculating height values for sample points in the distribution by sampling a height field,
calculating feature metrics for respective sample points in the distribution by approximating second derivatives of the points using height values of neighboring points in the distribution, and
refining the distribution of sample points by eliminating sample points from the distribution that have feature metrics indicating a respective locally flattish region of the height field, and by keeping non-eliminated sample points in the distribution.

20. The method according to claim 19, wherein said deriving further comprises:
calculating feature orientations for sample points in the distribution by using height values of neighboring points to find approximate directions of approximate greatest change in the height field, and
adding to the distribution points near extrema and features of the height field.

21. The method according to claim 20, further comprising:
  identifying borders of features in the height field and using the borders to constrain a triangulation of the distribution of sample points.

22. The method according to claim 19 wherein the distributions comprise grids of sample points uniformly distributed on the triangles, using sides of triangles as axes of the grid.

23. A method of displacing a surface, comprising:
  deriving a set of points for triangles in a tessellation of the surface, by
  creating a grid of points on and in a triangle,
  calculating height values for points in the grid by sampling a height field, the height field being applicable to points of any arbitrary surface,
  calculating feature metrics for points in the grid by approximating second derivatives of the points using height values of neighboring points,
  calculating feature orientations for points in the grid by using height values, according to the height field, of neighboring points to approximate discrete gradients in the height field,
  calculating, according to the height field, height values for new points in the triangle that are away from the points in the grid in the directions of the feature orientations,
  identifying new points that are near local extrema and features of the height field by approximating second derivatives of the new points using the height values of the new points, and
  compiling a set of points comprising grid points and identified new points.

24. A method of displacing a surface, comprising:
  parameterizing the surface by tessellating it into a first set of triangles;
  deriving a set of points for each triangle in the first set, by
  creating a non-orthogonal coordinate system defining points on and in the triangle, wherein the two shortest sides of the triangle are axes of the coordinate system and the triangle vertex where the axes intersect is an origin of the coordinate system,
  calculating a height value for most of the points by, for each such point, sampling a height field,
  calculating a feature metric for most of the points by, for each such point, summing a plurality of Taylor approximations taken in directions of a plurality of points neighboring the point, wherein the Taylor approximations are calculated using the height values of the neighboring points, and wherein the feature metric approximates an amount of local curvature in the height field in a local area of the point,
  at least one of discarding, ignoring, and flagging as unnecessary points having a feature metric indicating that the point is in a substantially locally flat area of the height field,
  calculating a feature orientation for most of the points that were not discarded, ignored, or flagged by, for each such point, using least squares minimization to fit a linear function to a plurality of points neighboring the point, wherein the feature orientation is a discrete gradient of the height field that approximates a direction from the point that has the greatest rate of local height change,
  for most points that have a feature orientation, sampling the height field at points uniformly distributed along a line segment within a neighborhood, wherein the line segment passes through the point in the direction of the feature orientation of the point, and wherein a rate of height change in the height field along the line segment is approximated for the point and each sample point by using their sampled height field values,
  for most points that have a line segment, relocating the point to a location of a closest sample point on the line segment that has a rate of height change above a threshold, and adding points at sample points on the line segment having a rate of height change indicating an an extrema or feature in the height field;
  creating a second set of triangles by constraining a Delaunay triangulation of the set of points of each triangle in the first set of triangles, wherein a constraint is a feature border of the height field in the triangle that is identified by the set of points; and
  building a final displaced surface geometry using the second set of triangles.

* * * * *

UNITED STATES PATENT AND TRADEMARK OFFICE
CERTIFICATE OF CORRECTION

PATENT NO.        : 7,133,044 B2
APPLICATION NO.   : 10/059292
DATED             : November 7, 2006
INVENTOR(S)       : Jerome Maillot et al.

It is certified that error appears in the above-identified patent and that said Letters Patent is hereby corrected as shown below:

Title Page, item [75] Column 1 (Inventors), Line 2, change "Xiaohuan Wang, Toronto (CA)" to --Xiahuan Corina Wang, San Francisco, CA, (US)--.

Column 7, Line 66, change "$_{at\ P_{i,j}}$" to --at $P_{i,j}$--.

Column 8, Line 40, change "$f_{max.,}$" to --$f_{max,}$--.

Column14, Line 41, change "area" to --surface--.

Column 14, Line 55, change "comprising" to --comprises--.

Column 14, Line 62, after "vertices of" delete "the".

Column 15, Line 4, change "a" to --the--.

Column 15, Line 17, change "and" to --or--.

Column 15, Line 21, change "representation" to --resolution--.

Column 15, Line 26, after "given" insert --sample--.

Column 15, Line 28, change "sample" to --sampled--.

Column 15, Line 30, change "sample" to --sampled--.

Column 15, Line 36, change "subdivisions," to --subdivision surfaces,--.

Column 16, Line 64, after "distribution" insert --sample--.

UNITED STATES PATENT AND TRADEMARK OFFICE
CERTIFICATE OF CORRECTION

PATENT NO.         : 7,133,044 B2
APPLICATION NO. : 10/059292
DATED              : November 7, 2006
INVENTOR(S)        : Jerome Maillot et al.

It is certified that error appears in the above-identified patent and that said Letters Patent is hereby corrected as shown below:

Column 18, Line 34, delete "an" before "extrema".

Signed and Sealed this

Thirteenth Day of March, 2007

JON W. DUDAS
*Director of the United States Patent and Trademark Office*